(12) United States Patent
Kawamura et al.

(10) Patent No.: US 6,471,901 B1
(45) Date of Patent: Oct. 29, 2002

(54) METHOD FOR MANUFACTURING INK JET RECORDING HEAD USING THERMOHARDENING FILLER

(75) Inventors: Shogo Kawamura, Numazu (JP); Yasutomo Watanabe, Hiratsuka (JP); Toshiaki Hirosawa, Hiratsuka (JP); Riichi Saito, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/488,931

(22) Filed: Jan. 21, 2000

(30) Foreign Application Priority Data

Jan. 27, 1999 (JP) .............................. 11-018024
Aug. 24, 1999 (JP) .............................. 11-236444
Jan. 14, 2000 (JP) ........................... 2000-005328

(51) Int. Cl.[7] .................. B29C 65/70; B29C 70/80; B29C 70/84
(52) U.S. Cl. ............................... 264/267; 29/890.1
(58) Field of Search ................ 264/267, 261, 264/263, 268, 273, 274; 29/890.1

(56) References Cited

U.S. PATENT DOCUMENTS

| | | | | |
|---|---|---|---|---|
| 4,083,902 A | * | 4/1978 | Clyde ........................ | 264/267 |
| 4,962,584 A | * | 10/1990 | Matsuda et al. ............. | 264/230 |
| 5,227,812 A | | 7/1993 | Watanabe et al. ............. | 347/50 |
| 5,576,748 A | | 11/1996 | Tamura ........................ | 347/58 |
| 5,868,887 A | * | 2/1999 | Sylvester et al. ............ | 156/150 |
| 6,000,924 A | * | 12/1999 | Wang et al. ................. | 425/125 |
| 6,027,590 A | * | 2/2000 | Sylvester et al. ............ | 156/150 |
| 6,041,501 A | * | 3/2000 | Suzuki et al. ............... | 29/890.1 |
| 6,080,354 A | * | 6/2000 | Miyajima .................... | 264/511 |
| 6,109,736 A | * | 8/2000 | Miyata et al. ................ | 347/68 |

* cited by examiner

*Primary Examiner*—Angela Ortiz
(74) *Attorney, Agent, or Firm*—Fitzpatrick, Cella, Harper & Scinto

(57) ABSTRACT

A method for manufacturing an ink jet recording head, which is provided with a recording elemental substrate having discharge port group for discharging ink, an electric wiring substrate electrically connected with the recording elemental substrate, and a supporting member for holding and fixing the recording elemental substrate and the electrical wiring substrate, comprises the steps of injecting thermohardening filler into a filler retaining portion communicated with the sealing area requiring sealing; filling the area with the thermohardening filler injected into the filler retaining portion by heating the filler to flow; and hardening the filled thermohardening filler. With the structure thus arranged, it is possible to eliminate any electrical and structural defects in order to materialize a highly reliable and compact ink jet recording head.

6 Claims, 16 Drawing Sheets

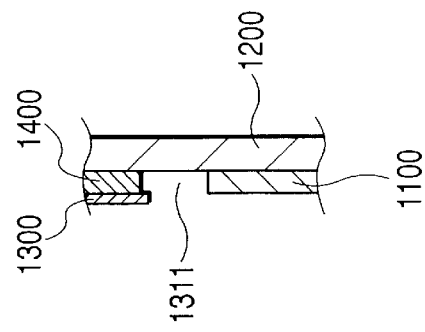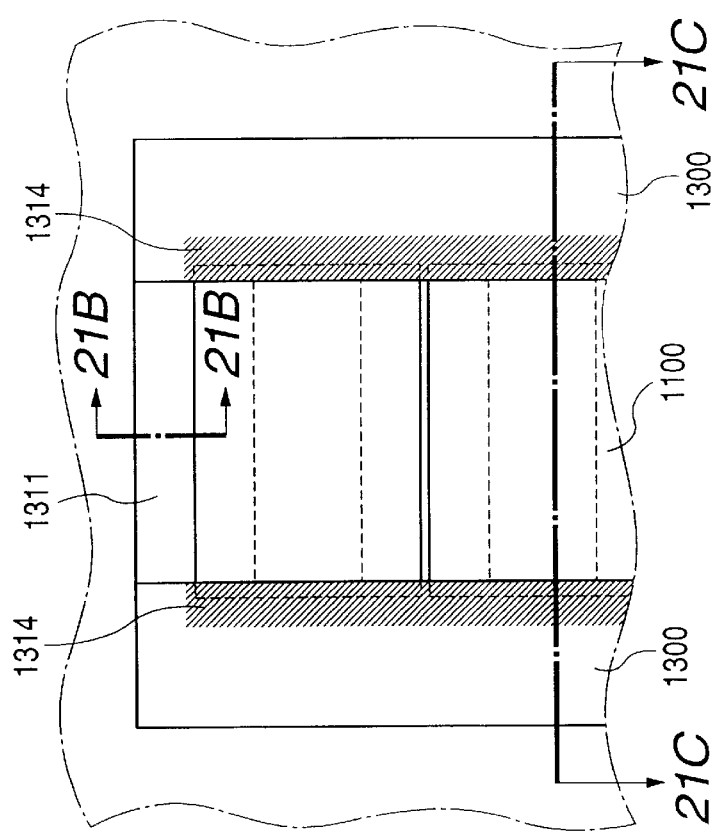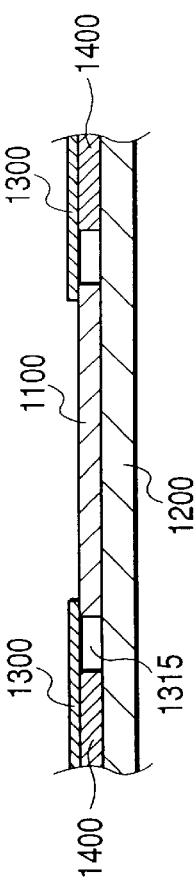

METHOD FOR MANUFACTURING INK JET RECORDING HEAD USING THERMOHARDENING FILLER

BACKGROUND OF THE INVENTION

1. Field of the Invention

The present invention relates to a method for manufacturing an ink jet recording head that records by discharging recording liquid onto a recording sheet. The invention also relates to an ink jet recording head manufacturing by such method of manufacture, and an ink jet recording apparatus having such ink jet recording head mounted thereon. More particularly, the invention relates to a method for manufacturing an ink jet recording head, which provides an improved method for coating filling agent on the circumference of the recording elemental substrates that constitute the ink jet recording head. The invention also relates to an ink jet recording head manufactured by such method of manufacture, as well as to an ink jet recording apparatus having such ink jet recording head mounted thereon.

2. Related Background Art

Generally, an ink jet recording apparatus is a recording apparatus that records by discharging recording liquid from the discharge ports onto a recording sheet. The apparatus comprises the ink jet recording head that forms recording liquid droplets which are discharged from the discharge ports, and the supply system that supplies recording liquid to the ink jet recording head.

The aforesaid ink jet recording apparatus is a recording apparatus of the so-called non-impact recording type, which makes it possible to perform a high speed recording on various recording media. The apparatus is also characterized in that it has almost no noises at the time of recording. Therefore, the apparatus is widely adopted as an apparatus that carries the recording mechanism, such as a printer, a word processor, a facsimile equipment, and a copying machine, among some others.

As the typical recording method that adopts the ink jet recording apparatus, there is the one that uses electrothermal converting elements. This method uses electrothermal converting elements for the pressure chamber which is arranged in the vicinity of the discharge ports. With the application of electric pulses that become recording signals provided for such elements to discharge the recording liquid from fine discharge ports as liquid droplets by the utilization of pressure exerted by bubbling (film boiling) of the recording liquid, hence performing the recording on the recording sheet.

Here, for the aforesaid discharge method of recording liquid, there is the type where the recording liquid is discharged in the direction parallel to the substrate having the electrothermal converting elements arranged thereon (that is, an edge shooter). Also, there is the one where the recording liquid is discharged in the direction perpendicular to the substrate where the electrothermal converting elements are arranged thereon (that is a side shooter).

FIG. 1 is a view which shows the general recording elemental substrate. FIG. 2 is a view which shows the state where the recording elemental substrate represented in FIG. 1 is connected with a wiring substrate.

As shown in FIG. 1 and FIG. 2, a plurality of discharge ports 2 are arranged on one side face of the recording elemental substrate 1 with recording elements for discharging recording liquid provided therefor. On the other face, the supply port 3 is arranged open in order to supply the recording liquid to the discharge ports 2 in a length almost equal to the length of the discharge port array 2. Then, the wiring substrate 4 is connected with the recording elemental substrate 1 by the application of the TAB assembling techniques or the like in order to apply the electric pulses for discharging the recording liquid. In this way, the recording element unit 6 is formed. Here, the wiring of the wiring substrate 4 is arranged on the reverse side thereof (not shown).

Also, on the recording elemental substrate 1, the sealing resin A5 is coated to protect the lead lines (not shown) that electrically connect the recording elemental substrate 1 and the wiring substrate 4 from erosion by the recording liquid, as well as from the breakage due to the force that may act from the outside.

FIG. 3 is an exploded perspective view which shows one structural example of the conventional ink jet recording head having the recording element unit 6 illustrated in FIG. 2 is arranged therefor. FIG. 4 is a perspective view which shows the external appearance after the completion of the assembling of the ink jet recording head illustrated in FIG. 3. FIG. 5 is a partially enlarged view of the section taken along line V—V in FIG. 4.

As shown in FIG. 3 and FIG. 4, a plurality of the recording element units 6a to 6c are adhesively fixed to the upper face of the supporting member 7 through the supporting plates 8a to 8c by the application of the bonding resin A9a to 9c, the bonding resin B10a to 10c, and the bonding resin C11a to 11c. Also, on the side face of the supporting member 7, the wiring integration substrate 12 is fixed in order to put electric signals together for a plurality of wiring substrates 4a to 4c, and then, electrically connected with a plurality of the wiring substrate 4a to 4c. In this respect, a reference numeral 20 designates the ink supply port.

Thus, as shown in FIG. 4, the face of the ink jet recording head on the recording liquid discharge port side is filled with the sealing resin B13 on the supporting plate 8, the opening portion of the recording element unit 6, and the circumference of the wiring substrate 4 (so as not to allow the supporting plate 8 to be exposed), hence protecting the wiring on the reverse side of the wiring substrate 4 from the recording liquid.

Also, in addition to the function that supports and fixes the wiring substrate 4, the supporting plate 8 functions as the heat radiation member that radiates heat generated by the recording elemental substrate 1. For this plate, therefore, it is generally practiced to use aluminum or some other material having good heat radiation. Consequently, as in the case of the wiring substrate 4, the supporting plate 8 should also be protected from the recording liquid by filling the sealing resin B13 on the circumference thereof.

However, the circumference of the recording elemental substrate 1 and the circumference of the wiring substrate 4 of the conventional ink jet recording head are sealed as described above in order to execute the sealing process efficiently in a short period of time (with the sealing resin B13a and 13b in FIG. 5).

As a result, there is a need for securing an area between the recording elemental substrate 1 and the wiring substrate 4 at least in the size which may allow the needle of the sealing resin coating machine to enter between them. The outer dimension of the wiring substrate 4 should then become larger by that portion inevitably.

Also, since the electric wiring pattern on the recording elemental substrate 1 is assembled by the application of the photolithographic techniques in high density up to the circumferential portion of the surface thereof, there is a possibility that even a small chipping on the outer circumference may cause the defective performance. Therefore, in order to protect the exposed portion of the electric wiring of the recording element unit, the filler is filled in the circumference thereof. Then, it is necessary to execute this filling in good precision so that the coating machine is not allowed to touch the recording elemental substrate.

Also, the sealing resin B13 is directly coated on the circumference of the recording elemental substrate 1, which makes it necessary to control the coating amount exactly. If the coating amount is too large, the sealing resin B13 may be caused to spread out to the surface of the recording elemental substrate 1 or the wiring substrate 4. If the recording head is completed in such a state that the sealing resin spreads out, it may become an obstacle when the surface of the recording elemental substrate 1 is cleaned after printing.

Also, depending on the viscosity of the sealing resin B13 and the thixotropy thereof, the cobwebbing phenomenon may take place when the needle of the coating machine leaves the sealing portion. In some cases, the sealing resin B13 adheres to the surface of the recording elemental substrate 1 in stripes, which may also become an obstacle when the cleaning is made as described above.

Also, when both sides of the recording elemental substrate 1 are sealed almost simultaneously, the air should remain to reside inevitably on the reverse side of the connecting portion (that is, the portion where the sealing resin A5 is applied) between the recording elemental substrate 1 and the wiring substrate 4. The bubbles of the air thus residing tend to escape externally by breaking the layer of the sealing resin B13 or to stay on the inner side. If it escapes externally, the layer of the sealing resin B13 is holed to be open, which results in the sealing defects. Further, if the bubbles are broken, the surface of the recording elemental substrate 1 may be stained by the adhesion of the sealing resin B13.

Also, if the bubbles resides on the inner side, the reverse side of the connecting portion (that is, the portion where the sealing resin A5 is applied) between the recording elemental substrate 1 and the wiring substrate 4 becomes hollow. Thus, there is a possibility that the wiring of the wiring substrate 4 is eroded by the recording liquid that may enter the reverse side of the wring substrate 4 from such portion that may become hollow.

Therefore, it is ideal to adopt a coating method which does not allow any bubbles to remain on the reverse side of the connecting portion (that is, the portion where the sealing resin A5 is applied) between the recording elemental substrate 1 and the wiring substrate 4. Then, if the sealing resin B13 is coated directly on the circumference of the recording elemental substrate 1, it is necessary to control the timing, the amount, and the coating frequency when one side of the sealing portion of the recording elemental substrate 1 is coated and the other side thereof is coated as the case may be.

However, if the coating timing, amount, and frequency should be controlled appropriately as described above, there is a fear that the time required for the sealing process is inevitably increased to a considerable extent.

Conventionally, therefore, there is still a room for improvement as to the satisfactory control of the appropriate filling amount in order to execute the filling of the filler in good precision when the filler is filled on the circumference of the recording elemental substrates as has been discussed above.

SUMMARY OF THE INVENTION

With a view to solving the problems encountered in the conventional art, the present invention is designed. It is an object of the invention to provide a method for manufacturing an ink jet recording head capable of filling the filler in good precision, while controlling the amount of filler appropriately when the filler is filled on the circumference of the recording elemental substrates, and also, to provide an ink jet recording head thus manufactured, as well as an ink jet recording apparatus having such ink jet recording head mounted thereon.

Also, in order to solve the problems encountered in the conventional art, it is another object of the present invention to improve the structure in which the sealing resin is filled on the circumference of the recording elemental substrates in order to eliminate any electrical and structural defects, and at the same time, to shorten the time required for the manufacturing process, while giving more freedom in designing the recording head, hence providing a method for manufacturing at lower costs an ink jet recording head having higher print quality and reliability, as well as an ink jet recording head thus manufactured, and an ink jet recording apparatus having such ink jet recording head mounted thereon.

In order to achieve the aforesaid objects, a method for manufacturing an ink jet recording head, an ink jet recording head, and an ink jet recording apparatus are structured as follows in accordance with the present invention:

(1) A method for manufacturing an ink jet recording head, which is provided with a recording elemental substrate having discharge port group for discharging ink, an electric wiring substrate electrically connected with the recording elemental substrate, and a supporting member for holding and fixing the recording elemental substrate and the electrical wiring substrate, comprises the following steps of:

injecting thermohardening filler into a filler retaining portion communicated with the sealing area requiring sealing;

filling the area with the thermohardening filler injected into the filler retaining portion by heating the filler to flow; and hardening the filled thermohardening filler.

(2) An ink jet recording head used for the method for manufacturing an ink jet recording head, which is provided with a recording elemental substrate having discharge port group for discharging ink, an electric wiring substrate electrically connected with the recording elemental substrate, and a supporting member for holding and fixing the recording elemental substrate and the electrical wiring substrate, comprises a filler retaining portion communicated with the sealing area for which sealing is required.

(3) An ink jet recording apparatus, which is provided with a carriage mounting on it the ink jet recording head having a recording elemental substrate provided with discharge port group for discharging ink, an electric wiring substrate electrically connected with the recording elemental substrate, and a supporting member for holding and fixing the recording elemental substrate and the electrical wiring substrate, and which further comprises a filler retaining portion communicated with the area (sealing area) for which sealing is required.

With the structure thus arranged in accordance with the present invention, the sealing resin is not coated directly on the circumference of the recording elemental substrate. As a result, there is no need for securing the space required to allow the needle of the sealing resin coating machine to enter on the circumference of the recording elemental substrates that become the sealing areas, nor between the adjacent recording elemental substrates, hence making it possible to make the outer dimension of the wiring substrates smaller to that extent.

Also, it becomes easier to control the coating amount, because the sealing resin is not coated directly on the circumference of the recording elemental substrate, particularly on the electrode portion, and then, the coating amount rarely changes abruptly.

Also, no cobwebbing phenomenon takes place when the needle of the coating machine leaves the sealing location, because the sealing resin is not coated directly on the circumference of the recording elemental substrate, thus making it possible to prevent the sealing resin from adhering to the surface of the recording elemental substrate.

Also, there is no need for the needle of the coating machine to approach directly the circumference of the recording elemental substrate when the sealing resin is coated. As a result, it becomes possible to eliminate any possibility that chipping occurs on the outer circumference of the recording elemental substrate.

Also, it becomes unnecessary to control the coating timing of the sealing resin between the sealer coating location on one side of the recording elemental substrates and that on the opposite side. As a result, the time required for the coating process can be shortened.

Also, the filler retaining portion is arranged to be communicated with the vicinity of the center of the reverse side where the recording elemental substrate and the wiring substrate are electrically connected. Thus, the sealing resin is filled beginning with such portion to avoid the presence of residual bubbles.

Also, with the supporting substrate being inclusively arranged between the recording elemental substrate and the supporting member, it becomes possible to fill the filler through a plurality of communication holes by only one coating with the provision of the plurality of the holes which are communicated from the filler retaining portion to the sealing area. In this manner, the time required for the filling process can be shortened.

As described above, in accordance with the present invention, it is possible to provide a highly reliable high print quality ink jet recording head at lower costs without electrical and structural defects.

BRIEF DESCRIPTION OF THE DRAWINGS

FIG. 21A is a plan view which shows a part of the laminated state of the elements that constitute the recording element unit represented in accordance with the first embodiment of the present invention;

FIG. 21B is a cross-sectional view taken along line 21B—21B in FIG. 21A; and

FIG. 21C is a cross-sectional view taken along line 21C—21C in FIG. 21A.

DETAILED DESCRIPTION OF THE PREFERRED EMBODIMENTS

Hereinafter, with reference to the accompanying drawings, the embodiments are described in accordance with the present invention.

(First Embodiment)

Figure 6:
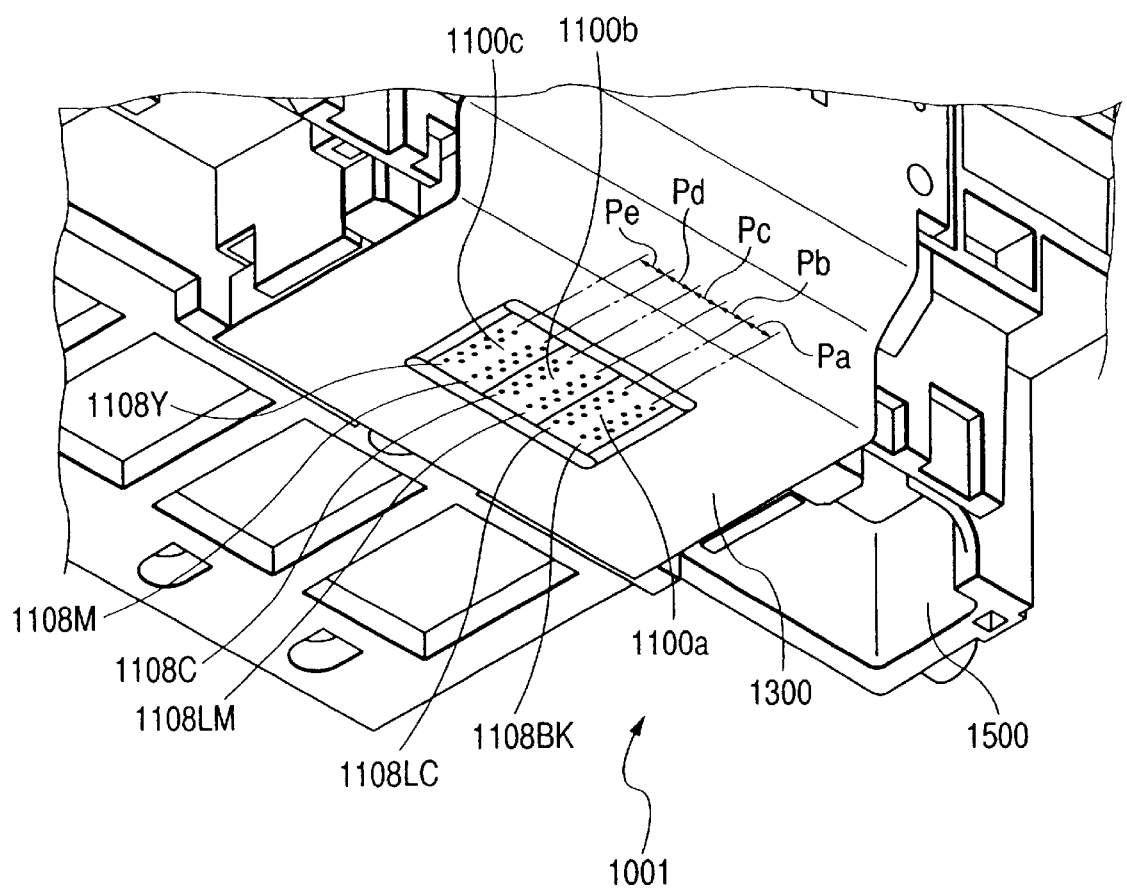
FIG. 6 is a partially enlarged view which shows the structure of a recording head in accordance with a first embodiment of the present invention.
Figure 7:
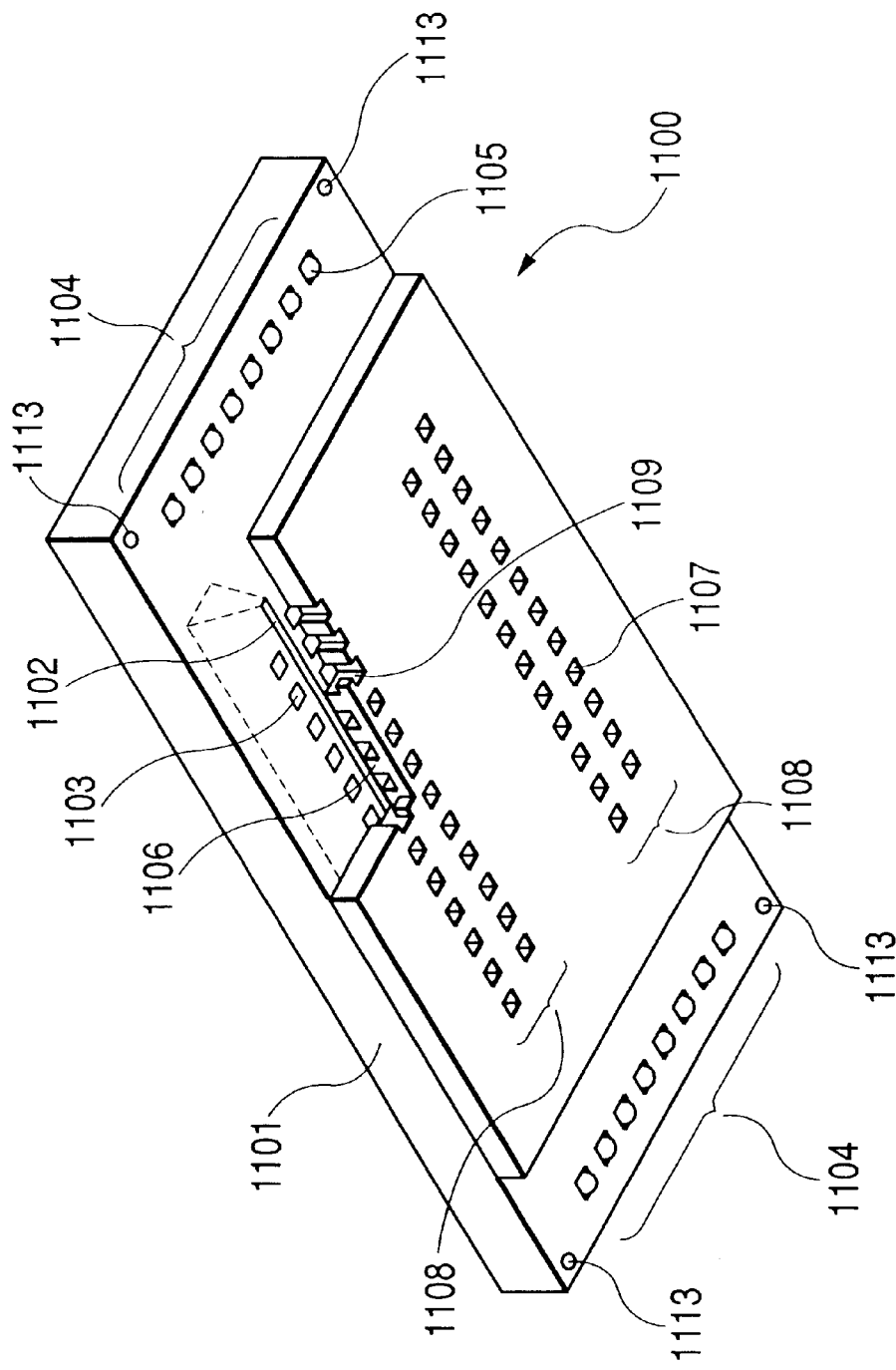
FIG. 7 is a view which illustrates the recording elemental substrate used for the recording head represented in FIG. 6.

FIG. 6 is a partially enlarged view which shows the structure of a recording head in accordance with a first embodiment of the present invention. FIG. 7 is a view which illustrates the recording elemental substrate used for the recording head represented in FIG. 6.

Figure 8:
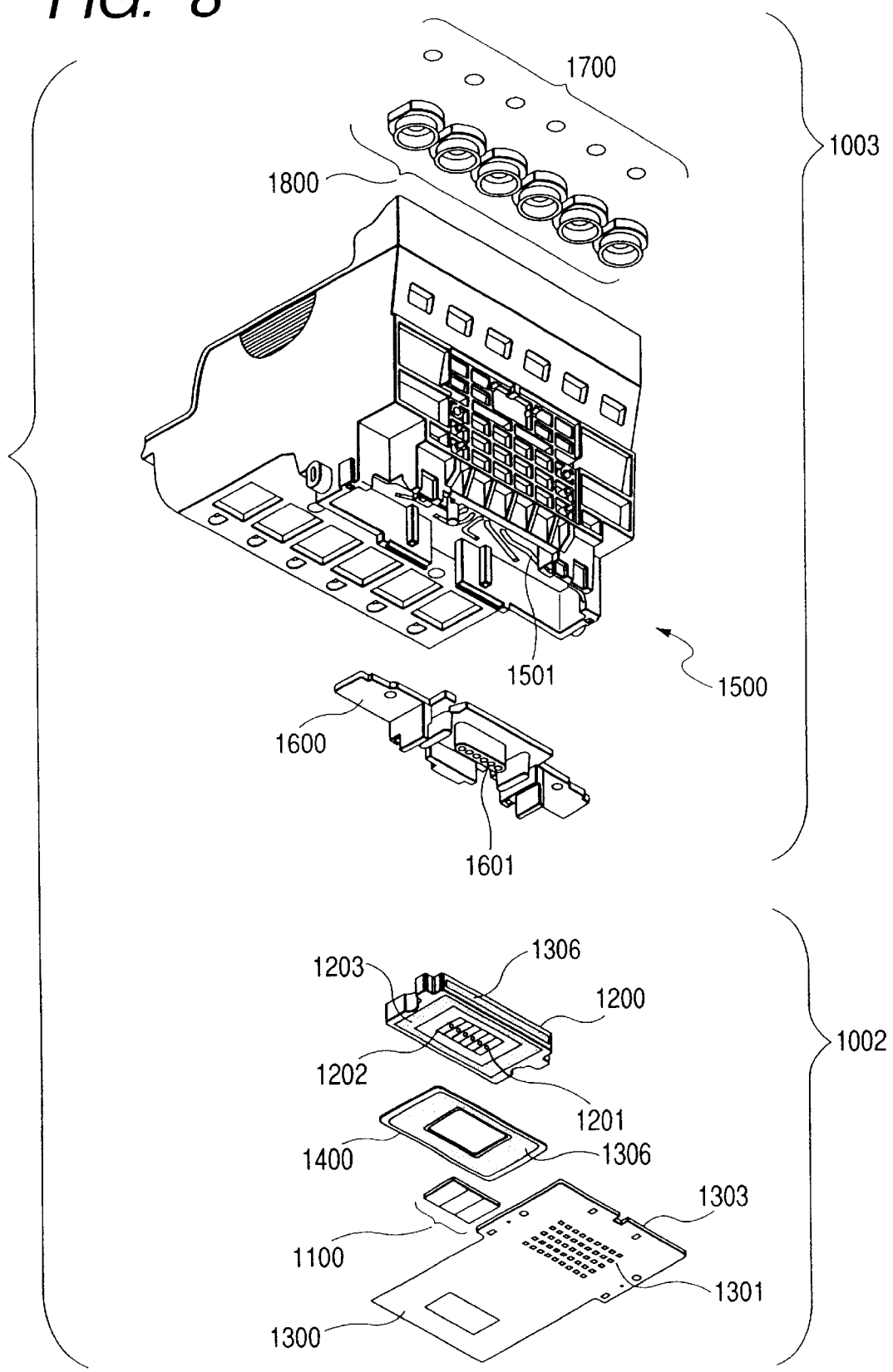
FIG. 8 is an exploded perspective view which shows the recording head represented in FIG. 6.
Figure 9:
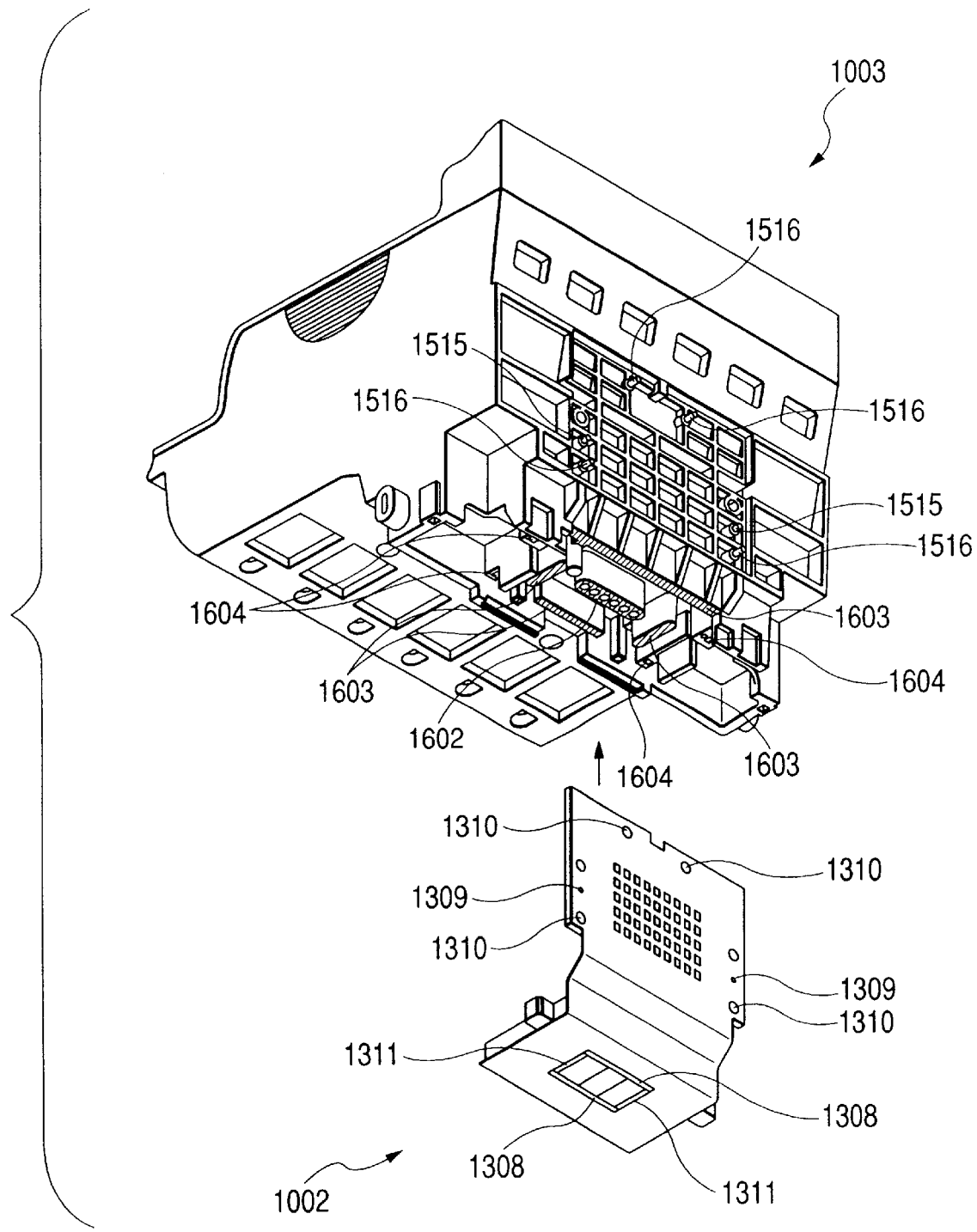
FIG. 9 is a view which illustrates the coupling of the recording elemental substrate and the tank holder unit of the recording head shown in FIG. 6.
Figure 10:
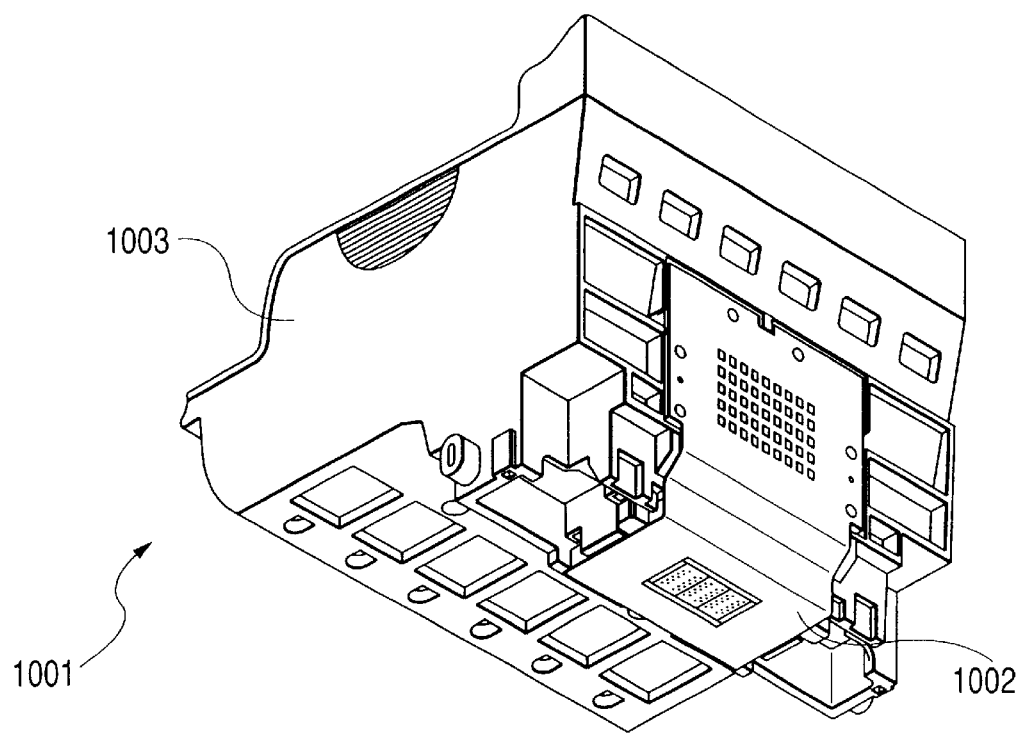
FIG. 10 is a view which shows the entire body of the recording head represented in FIG. 6.

Also, FIG. 8 is an exploded perspective view which shows the recording head represented in FIG. 6. FIG. 9 is a view which illustrates the coupling of the recording elemental substrate and the tank holder unit of the recording head shown in FIG. 6. Then, FIG. 10 is a view which shows the entire body of the recording head represented in FIG. 6.

In accordance with the present embodiment, the recording head 1001 is a recording head of the bubble jet side shooter type which records by use of the electrothermal converting elements that generate thermal energy for the creation of film boiling in accordance with electric signals.

The recording head 1001 is formed by the recording element unit 1002 and the tank holder unit 1003 as shown in FIG. 9. The recording element unit 1002 is provided with the filler retaining portion 1311 continuously connected to the gap with the recording elemental substrate arranged in parallel. Then, the structure is arranged to heat the thermal hardening filler retained in the filler retaining portions so as to fill it on the circumference of the recording elemental substrate, hence protecting the electrically connecting portion from erosion by ink, as well as from the external shocks that may be caused.

Also, as shown in the exploded perspective view in FIG. 8, the recording element unit 1002 comprises the recording elemental substrate 1100, a first plate 1200, an electric wiring substrate 1300, and a second plate 1400. Then, the tank holder unit 1003 comprises a tank holder 1500, a liquid flow path formation member 1600, filters 1700, and sealing rubbers 1800.

For the recording head thus structured, the description will be made of the entire body thereof, while briefly describing those structural members.

At first, the description will be made of the recording element unit in accordance with the present embodiment.

FIG. 7 is a partially broken perspective view which illustrates the structure of the recording elemental substrate 1100.

The recording elemental substrate 1100 is the Si substrate 1101 of 0.5 mm to 1 mm thick, for example, which forms a thin film.

Also, there are formed the two ink supply ports 1102 serving as ink flow paths of two colors, each having a through opening in the form of an elongated groove. On both side of each ink supply port 1102, each one line of the electrothermal converting elements 1103 is arranged in zigzag. The electrothermal converting elements 1103, and the electric wires of Al or the like which supply electric power to the electrothermal converting elements 1103 are formed by the application of the film formation technologies and techniques.

Also, for the electrode unit 1104 arranged for supplying electric power to the electric wiring, the bumps 1105 of Au or the like are provided by means of plating or wire bonding by patterning, which performs the ball electrode formation (the formation of stud bumps).

Each of the ink supply ports 1102 is formed by means of anisotropic etching which utilizes the crystalline orientation of the Si substrate 1101. If the crystalline orientation <111> exists on the wafer surface <100> in the thickness direction, the etching advances at an angle of approximately 54.7° with the alkaline (KOH, TMAH, hydrazine, or the like) etching.

Using this method the etching is performed for a desired depth.

Also, on the Si substrate 1101, there are formed by means of the photolithographic techniques the ink flow path walls 1106 which form the ink flow paths 1106 communicated with the bubbling chamber 1109 each having the electrothermal converting element 1103 therein, and the discharge ports as well. Thus, two lines of discharge port groups 1108 are formed corresponding to ink of two colors.

Also, the electrothermal converting elements 1103 are arranged to face the discharge ports 1107, respectively. The ink which is supplied from each ink supply port 1102 is discharged by the action of film boiling.

For the present embodiment, by use of the three recording elemental substrates 1100a, 1100b, and 1100c as shown in FIG. 6 and FIG. 8, the six discharge port groups 1108Bk, 1108LC, 1108LM, 1108C, 1108M, and 1108Y are provided corresponding to ink of six colors (black:Bk, light cyan:LC, light magenta:LM, cyan:C, magenta:M, and yellow:Y), respectively.

Then, as shown in FIG. 8, the first plate 1200 is formed by alumina ($Al_2O_3$) material of 0.5 to 10 mm thick, for example. Here, the material of the first plate 1200 is not necessarily limited to alumina. It may be possible to form this plate with the material having the same linear expansion rate as that of the material used for the recording elemental substrate 1100, and also, having the heat conductive ratio equal to or more than that of the material used for the recording elemental substrate 1100.

The material of the first plate 1200 may be either one of silicon (Si), aluminum nitride (AlN), zirconium, silicon nitride ($Si_3N_4$), silicon carbide (SiC), Molybdenum (Mo), and tungsten (W).

For the first plate 1200, the six ink supply ports 1201 are formed on the recording elemental substrate 1100 at the same pitches in order to supply ink of six colors. The six ink supply ports 1102, each two of them being formed respectively for the three recording elemental substrates 1100a, 1100b, and 1100c, correspond to the six ink supply ports 1201 of the first plate 1200, respectively. Then, as shown in FIG. 6, the six discharge port groups 1108Bk, 1108LC, 1108LM, 1108C, 1108M, and 1108Y, which are formed in two, respectively, for the three recording elemental substrates 1100a, 1100b, and 1100c, are adhesively fixed to the first plate 1200 in good positional precision so that each of the pitches Pa, Pb, Pc, Pd, and Pe is all made equal.

The first bonding agent 1202 used for the adhesive fixation is coated on the first plate 1200 almost in the shape of the recording elemental substrate, but it is coated with care so that no air passage is created between the adjacent ink supply ports.

The first bonding agent 1202 should desirably be the one, for example, which has a lower viscosity and a thinner adhesive layer to be formed on the contact surface, and further, it has a comparatively high hardness and resistance to ink.

It is desirable to adopt the thermohardening bonding agent having epoxy resin as its main component for the first bonding agent 1202, for example, and the thickness of the adhesive layer should be 50 µm or less.

The electric wiring substrate 1300 is to apply electric signals to the recording elemental substrates 1100 to make ink discharge possible. This substrate comprises the opening portions through which the recording elemental substrates 1100 are incorporated; the electrode terminals (not shown) corresponding to the electrodes 1104 of each recording elemental substrate 1100; and the external signal input terminal 1301 positioned at the end portion of the wiring for the reception of the electric signals from the apparatus main body.

The electric wiring substrate 1300 and the recording elemental substrates 1100 are electrically connected. The connecting method thereof, for example, is such that the thermohardening bonding resin (not shown) is coated between the electrodes 1104 of each recording elemental substrate 1100 and the electrode terminal of the electric wiring substrate 1300, and after that, the electrodes 1104 of the recording elemental substrate 1100 and the electrode terminal of the electric wiring substrate 1300 are heated together under pressure by use of the heating tool so as to harden the thermohardening bonding resin, and that the electrodes 1104 and the electrode terminal are electrically connected together. Also, as the thermohardening bonding resin, the anisotropic conductive bonding agent that contains conductive particles may be used in the same manner as described above.

For the structure of the present embodiment, it is possible to electrically connect the electrodes 1104 of the recording elemental substrates 1100 and the gold-plated electrode terminal of the electric wiring substrate 1300 desirably by heating under pressure at a temperature of 170 to 250° C. with the anisotropic conductive bonding film formed by the bonding agent whose main components are the conductive nickel particles of 2 to 6 µm diameter per particle, and epoxy resin, for example.

As the material of the electric wiring substrate 1300, the flexible wiring substrate having the wiring of the double-layered structure is used, for example, and the surface layer thereof is covered by resist film.

Also, on the reverse side of the external signal input terminal 1301, the reinforced plate 1303 is adhesively bonded to improve the flatness of the external signal input terminal 1301 portion. For the reinforced plate 1303, the heat resistive material, such as 0.5 to 2 mm epoxy glass, aluminum, is used, for example.

The second plate 1400 is formed by the alumina ($Al_2O_3$) material of 0.5 to 1.0 mm thick, for example. Here, the material of the second plate is not necessarily limited to alumina. It may be possible to form this plate with the material that has the same linear expansion rate as that of the recording elemental substrate 1100 and the first plate 1200, and also, it has the same heat conductive ratio equal to or more than that of those members. Then, the second plate 1400 is configured to provide a large opening portion than the outer dimension of the recording elemental substrate 1100 adhesively fixed to the first plate 1200.

Also, the second plate is bonded to the first plate 1200 by use of the second bonding agent 1203 so that the recording elemental substrate 1100 and the electric wiring substrate 1300 are electrically connected on the plane, and the reverse side of the electric wiring substrate 1300 is adhesively fixed by use of the third bonding agent 1306.

Figure 1:
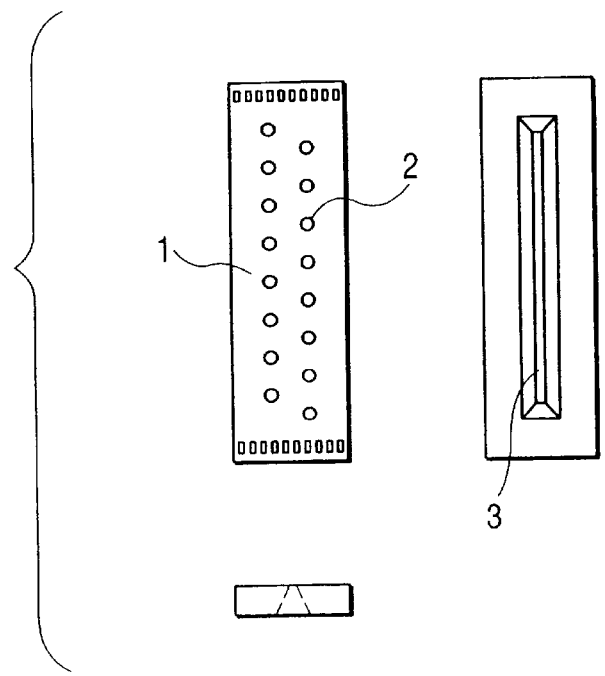
FIG. 1 is a view which shows the general recording elemental substrate.
Figure 2:
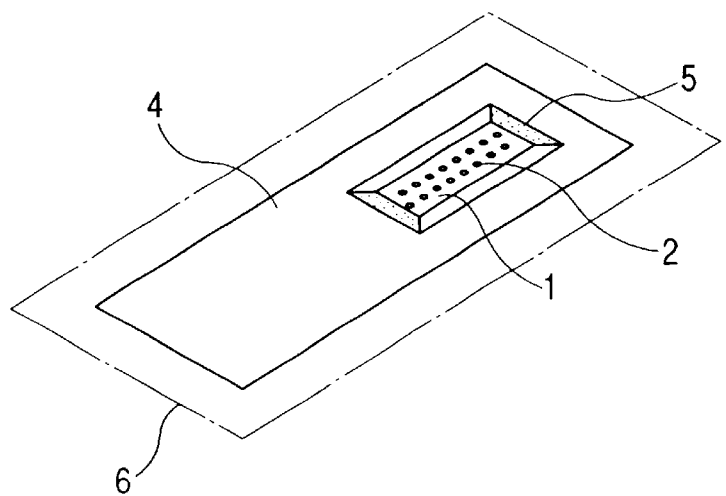
FIG. 2 is a view which shows the state where the recording elemental substrate represented in FIG. 1 is connected with a wiring substrate.
Figure 3:
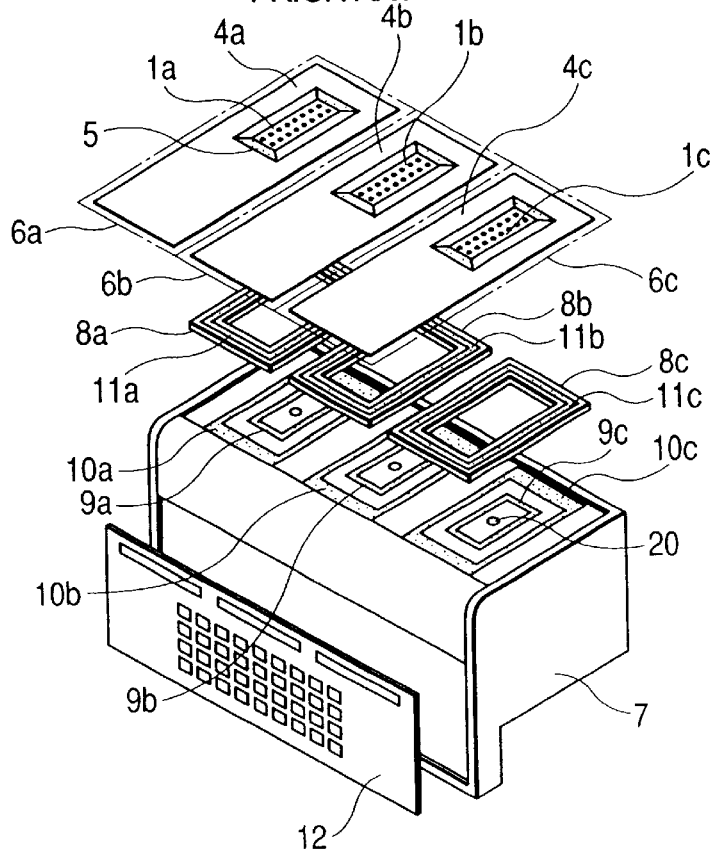
FIG. 3 is an exploded perspective view which shows one structural example of the conventional recording head having the recording element unit represented in FIG. 2 arranged therefor.
Figure 4:
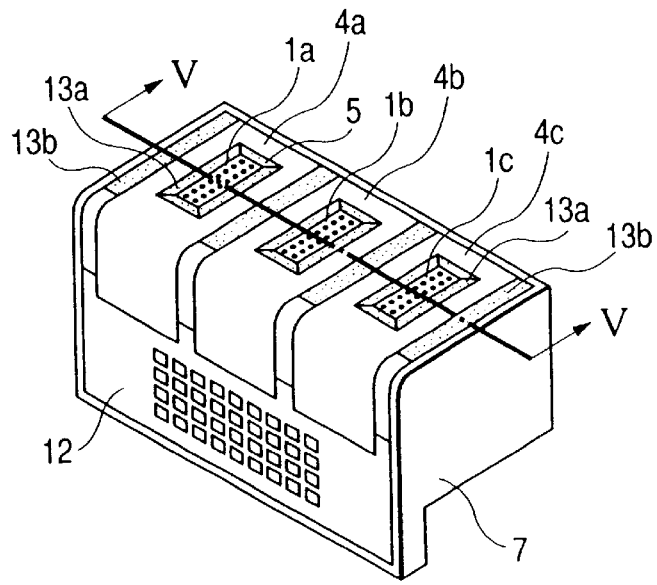
FIG. 4 is a perspective view which shows the outer appearance of one structural example of the conventional ink jet recording head having the recording element unit represented in FIG. 2 arranged therefor after the completion of the assembling.
Figure 5:
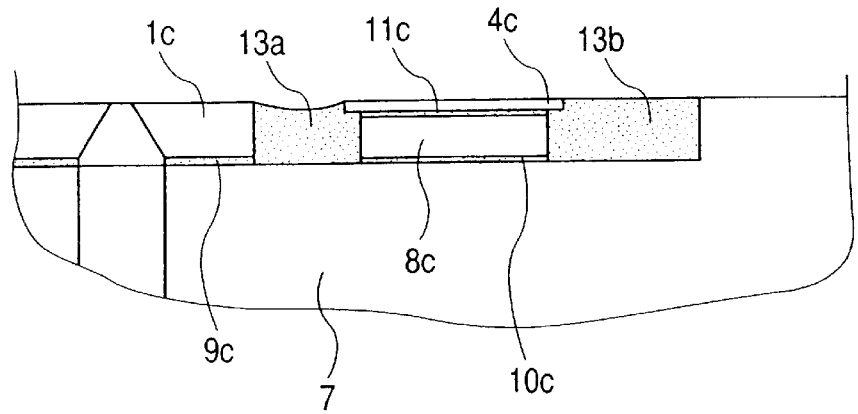
FIG. 5 is a partially enlarged view which shows the section taken along line V—V in FIG. 4 illustrating one structural example of the conventional ink jet recording head having the recording element unit represented in FIG. 2 arranged therefor after the completion of the assembling.

Also, at the same time that the electric wiring substrate 1300 is bonded to the second plate 1400, it is folded on one side face of the first plate 1200 and the second plate 1400 as shown in FIG. 4. Then, it is bonded to the side face of the first plate 1200 by use of the third bonding agent 1306. For the second bonding agent 1203, the one which has a low viscosity with a thin bonding layer formed on the contact surface, and also, has resistance to ink. Also, for the third bonding agent 1306, the thermohardening bonding film of 10 to 100 µm thick, whose main component is epoxy resin, is used, for example.

The electrically connected portion between the recording elemental substrates 1100 of the recording element unit 1002 and the electric wiring substrate 1300 is filled with the first filler and the second filler so as to protect the electrically connected portion from erosion and the external shocks.

The structure of the circumference of the recording elemental substrate 1100 is formed, as shown in FIG. 8, by the second plate 1400 which is adhesively fixed to the first plate 1200 in a shape as if to form a dam thereon, and then, the recording elemental substrate 1100 is adhesively fixed to the interior of the dam thus configured.

Now, FIG. 21A is a plan view which shows schematically a part of the structure of the members combined in this manner. FIG. 21B is a cross-sectional view taken along line 21B—21B in FIG. 21A. FIG. 21C is a cross-sectional view taken along line 21C—21C in FIG. 21A.

As shown in FIGS. 21A to 21C, the second plate 1400 is laminated on the first plate 1200, and the recording elemental substrate 1100 is laminated above them. Then, the opening portion is formed to enable the recording elemental substrate 1100 to be exposed. Then, the electric wiring substrate 1300 is further laminated with the electric wiring 1314 being formed on the reverse side of the aforesaid opening portion. (Here, in FIG. 21A, the electric wiring 1314 is represented as if to exist on the surface of the electric wiring substrate 1300 in order to make the arrange readily understandable. In practice, however, the electric wiring is arranged on the reverse side as described earlier.) In this respect, the terminals 1314 provided for the electric wiring substrate 1300 are arranged to face the electrodes 1104 provided for the recording elemental substrate 1100. The positioning here is made when the electric wiring substrate 1300 is laminated on the recording elemental substrate 1100.

In this state, as shown in FIGS. 21B and 21C, the filler retaining portion 1311 and the gap region 1315 where the filler (1312) is filled are still the spatial portions, respectively. Then, the filler retaining portion 1311 serves as the filler injection port for filling the gap region 1315 with the filler.

The recording element unit 1002 thus formed by lamination is mounted on the work fixing state 1704 of the manufacturing apparatus which will be described later. Then, the filler is filled.

There are two kinds of fillers used for the present embodiment, that is, the first filler 1312 which is filled from the filler retaining portion 1311 to fill the gap region 1315 therewith, and the second filler 1308 which is used to secure the connection between the electric wiring 1314 of the electric wiring substrate 1300 and the electrodes 1104 of the recording elemental substrate 1100, and then, to seal the exposed tip portions of the electric wiring 1314.

Figure 11:
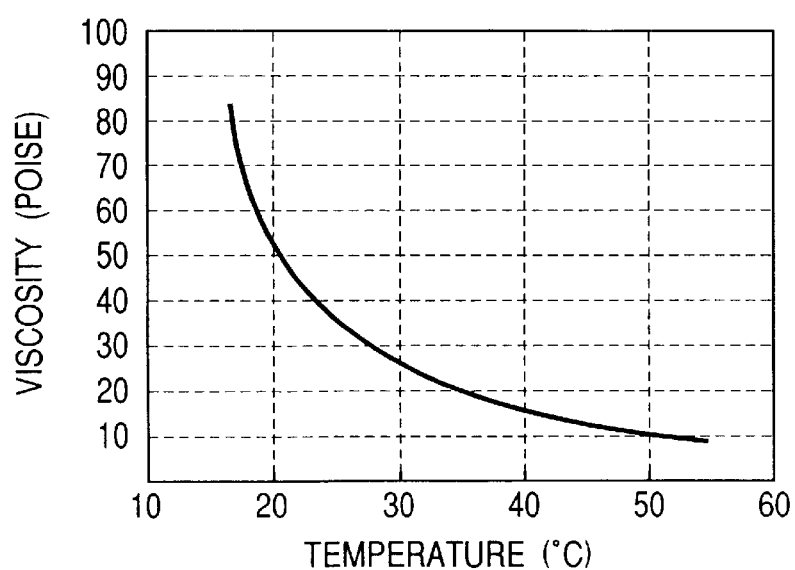
FIG. 11 is a view which illustrates the viscous property of the thermohardening filler used for the present embodiment.

The first filler 1312 used for the present embodiment is the one which has good permeability, such as a flip-chip under filler used for assembling bare chips, because the gap between recording elements is set at 30 to 300 μm, for example. More specifically, the filler is the flip-chip under filler whose main component is epoxy resin. The viscosity of the first filler 1312, that is, the thermohardening filler (the flip-chip under filler) is 50 poise at the room temperature, but it is characterized in that the viscosity is lowered to 15 poise or less when heated at a temperature of 40 to 70° C. Therefore, when the filler is filled, the first filler 1312 is filled in the filler retaining portion 1311 in an appropriate amount, while the first plate 1200 of the recording element unit 1002 mounted on the manufacturing apparatus is being heated at a temperature of 40 to 70° C., and then, after that, the filler is left intact for a period of approximately 3 to 10 minutes until the under filler is permeated on the entire circumference of the recording elemental substrate. In this respect, FIG. 11 shows the viscous characteristics of the thermohardening filler used for the present embodiment.

Also, the second filler 1308 used for the present embodiment contains almost the same components as the under filler with a higher viscosity, but its flowability is lower.

Now, hereunder, the description will be made of the method of manufacture briefly sequentially.

Figure 22B:
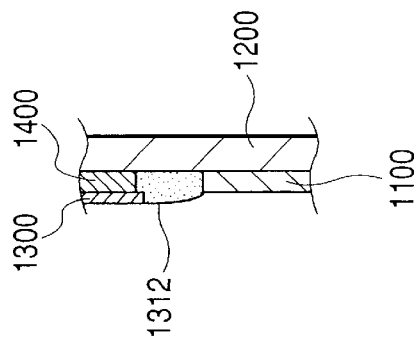
FIG. 22B is a cross-sectional view taken along line 22B—22B in FIG. 22A.
Figure 22A:
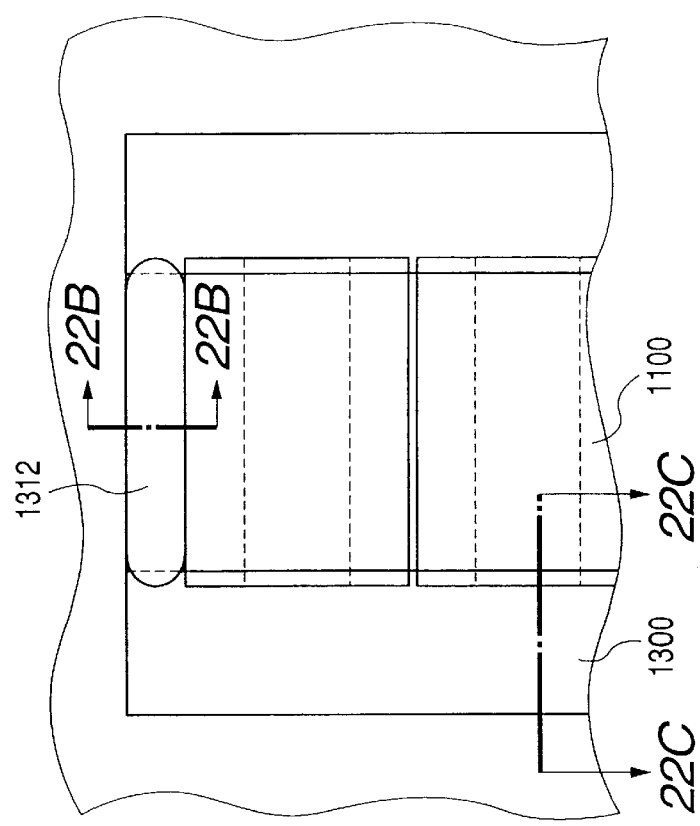
FIG. 22A is a plan view which shows a part of the filling state of a first filler for the recording element unit represented in accordance with the first embodiment of the present invention.
Figure 22C:
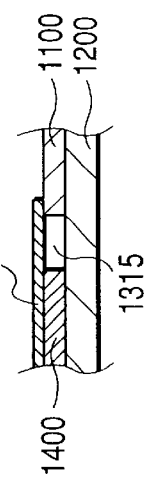
FIG. 22C is a cross-sectional view taken along line 22C—22C in FIG. 22A.
Figure 23B:
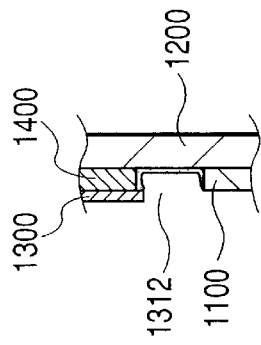
FIG. 23B is a cross-sectional view taken along line 23B—23B in FIG. 23A.
Figure 23D:
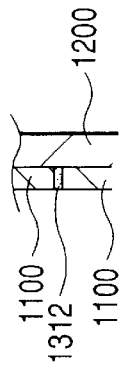
FIG. 23D is a cross-sectional view taken along line 23D—23D in FIG. 23A.
Figure 23A:
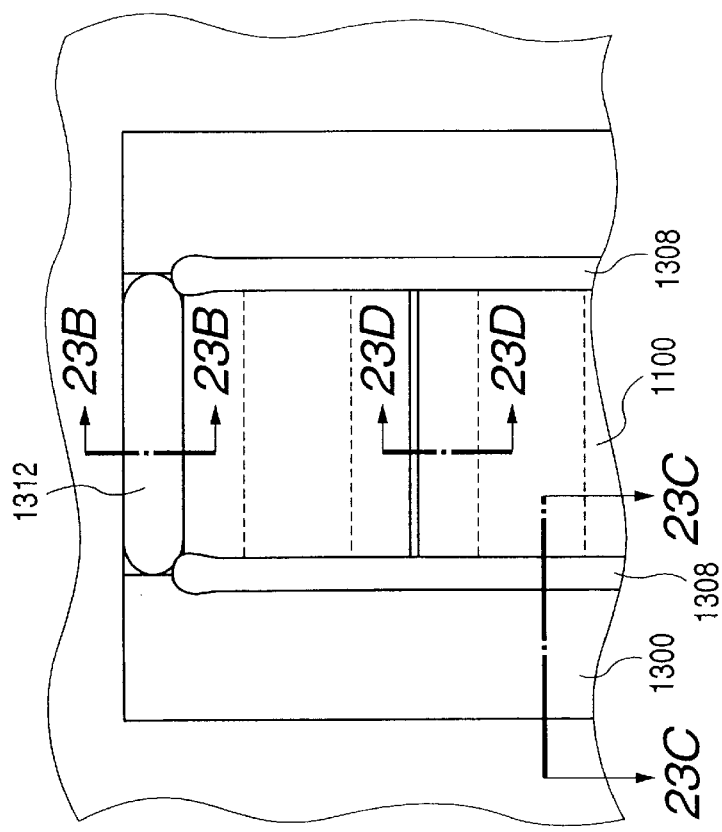
FIG. 23A is a plan view which shows a part of the state after the first filler has flown, and then, after a second filler is filled and sealed for the recording element unit represented in accordance with the first embodiment of the present invention.
Figure 23C:
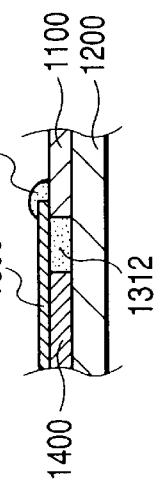
FIG. 23C is a cross-sectional view taken along line 23C—23C in FIG. 23A.
Figure 24:
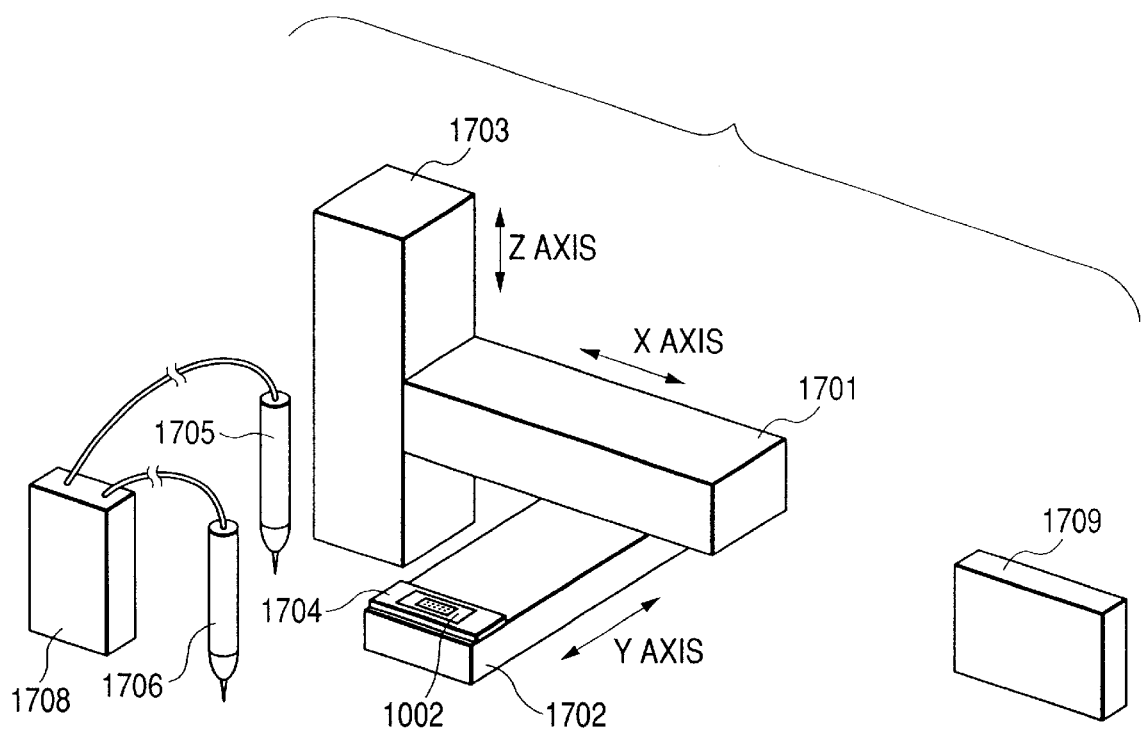
FIG. 24 is a view which schematically shows the structure of the manufacturing apparatus used for the first embodiment in accordance with the present invention.

The recording element unit 1002 thus laminated and assembled is fixed to the work fixing stage 1704. The filling of the filler in this recording element unit is then executed in such a manner that the moving arm A1701, the moving arm B1702, and the moving arm C1703 of the manufacturing apparatus shown in FIG. 24 are positioned, while moving, respectively, in the X axial direction, the Y axial direction, and the Z axial direction, and that as shown in FIG. 22A and FIG. 22B, the first filler 1312 is filled in the filler retaining portion 1311 by being pushed out from the filler container A1705 by means of the air supplied under pressure by the pressure device 1708. At this juncture, as shown in FIG. 23C, the first filler 1312 flows around to fill the gap between the recording elemental substrates.

Here, in the filling process of the first filler 1312, the temperature is adjusted for the work fixing stage 1704 that mounts the recording element unit 1002 as the work. The temperature of the first plate 1200 is then adjusted to 40° C. to 70° C. As a result, the viscosity of the first filler 1312 is lowered. Thus, being left intact for a period of 3 to 10 minutes, the filler flows from the filler retaining portion 1311 into the gap region 1315. Then, as shown in FIGS. 23A and 23B, most of the first filler 1312 in the filler retaining portion 1311 do not remain in it any longer. Most of it moves into the gap region 1315 which is now filled with the first filler 1312.

After that, the second filler 1308 which is almost of the same component with a higher viscosity, but which has a lower flowability is coated so that the electric wiring portion 1314 of the opening portion of the electric wiring substrate 1300 position on the surface of the recording elemental substrate 1100 is not allowed to be exposed in order to secure the connections of wiring.

The various controls of the manufacturing apparatus described above are performed by a control device designated by a reference numeral 1709.

When the filling of the first filler 1312 and the second filler 1308 is completed, the recording element unit 1002, that is, the work is removed from the stage 1704. Then, the work thus removed is put into the oven to give the thermohardening treatment for the two kinds of fillers simultaneously at a temperature of 80 to 150° C. for a period of 2 to 5 hours.

Here, the target amount of the first filler to be used is the amount to fill up the electric wiring completely on the reverse side of the electric wiring substrate 1300. However, the smaller the amount of the first filler that may remain in the filler retaining portion 1311 in the state after the thermohardening treatment, the better, because the recording elemental substrate 1100 is weaker against the external force that acts in the direction in which the filler retaining portion 1311 is arranged, that is, the external force which acts perpendicular to the longitudinal direction of the ink supply port 1102.

In accordance with the present embodiment, it is possible to obtain the preferable filling condition by making the thickness of the remaining first filler approximately ⅓ or less the thickness of the recording elemental substrate 1100. Also, as to the coating amount of the second filler 1308, it is better to suppress the height of the filler as low as possible, because the gap between the discharge port surface of the recording elemental substrate 1100 and a recording sheet depends on the height of the filler, while the print quality is affected by such gap eventually.

The electric wiring substrate 1300 of the recording element unit 1002 thus structured is configured to match the shape of the holder unit 1003. Further, the required forming is executed then.

Now, the description will be made of the tank holder unit.

The tank holder 1500 shown in FIG. 8 is formed by resin molding, for example. Here, it is desirable to use the resin material having glass filler of 5 to 40% mixed in it so as to enhance the forming robustness thereof.

The tank holder 1500 is to hold an ink tank detachably. Also, this holder is one of the structural parts of the tank holder unit 1003 that forms the ink flow paths 1501 to guide ink from the ink tank to the recording element unit 1002. With the flow path formation member 1600 being fused to it by means of ultrasonic waves, the ink flow paths 1501 are formed.

Also, the filer 1700 is bonded by heat welding to the joint (not shown) which is coupled with the ink tank in order to prevent any external dust particles from entering the ink tank. further, the sealing rubber 1800 is installed in order to prevent ink from being evaporated from the joint portion.

Now, the description will be made of the structure with which to joint the recording head unit to the tank holder unit.

As described earlier in conjunction with FIG. 9, the recording head 1001 is structured by coupling the recording head unit 1002 with the tank holder unit 1003. This structure is as follows:

The ink supply port (the ink supply port 1201 of the first plate 1200) of the recording element unit 1002 and the ink supply port (the ink supply port 1601 of the flow path formation member 1600) of the tank holder unit 1003 are adhesively fixed by the application of the fourth bonding agent 1602 so that both units are communicated with each other.

Also, several locations, in which the recording element unit 1002 and the tank holder unit 1003 are bonded other than those ink supply port portions, are adhesively fixed by the application of the fifth bonding agent 1603. Both the fourth bonding agent 1602 and the fifth bonding agent 1603 are resistive to ink, and are able to be hardened at the room temperature. Further, it is desirable that these bonding agents are flexible so as to withstand the linear expansion differential between different kinds of materials. For the present embodiment, the silicone bonding agent of hygroscopic hardening type is used, for example.

Also, the fourth bonding resin 1602 and the fifth bonding resin 1603 may be the same bonding agent without any problem. Also, when the recording element unit 1002 is bonded to the tank holder unit 1003 by use of the fourth bonding agent 1602 and the fifth bonding agent 1603, the recording element unit 1002 is positioned and fixed by use of the sixth bonding agent 1604. For the sixth bonding agent 1604, it is desirable to use the bonding agent which can be hardened instantaneously. For the present embodiment, a ultraviolet hardening bonding agent is used. Here, however, any other bonding agent may be adoptable.

Also, the external signal input terminal 1301 portion of the recording element unit 1002 is positioned and fixed by the terminal positioning pin 1515 (two locations) and the terminal positioning hole 1309 (two locations) to one side face of the tank holder 1500. The fixing method is, for example, is such that the terminal coupling pins 1515 arranged for the tank holder 1500 are allowed to fit into the terminal coupling holes 1310 arranged for the circumference of the external signal input terminal 1301 of the electric wiring substrate 1300, and that the terminal coupling pins 1515 are thermally welded for fixation. Here, however, any other fixing means may be usable.

With the ink jet recording head of the present embodiment thus structured, the filler is filled on the circumference of the recording elemental substrate by heat the thermohardening filler retained in the filler retaining portion. As a result, there is no need for directly coating it between the adjacent recording elemental substrates, hence making it possible to execute good filling even in a case where the gap between the recording elemental substrates is as narrow as 30 $\mu$m. Therefore, the side of the electric wiring substrate can be made smaller. Also, there is no possibility that the filler coating machine is allowed to be in contact with the recording elemental substrate other than the location where it is adjacent to the filler retaining portion.

Consequently, it is possible to provide a compact ink jet recording head which is highly reliable in the electrical performance thereof.

(Second Embodiment)

Figure 12:
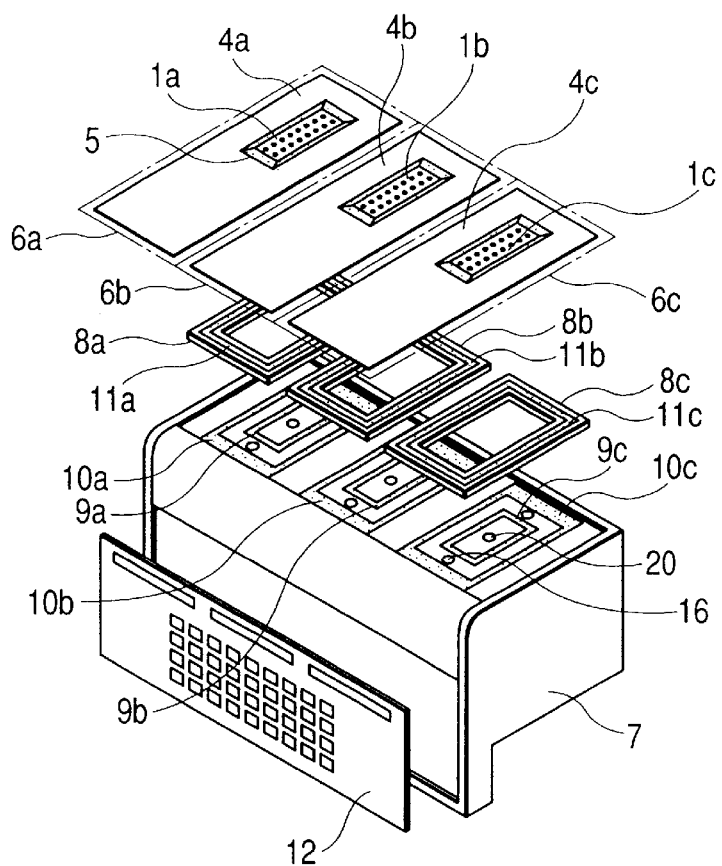
FIG. 12 is an exploded perspective view which shows the structure of the ink jet recording head in accordance with a second embodiment of the present invention.
Figure 13:
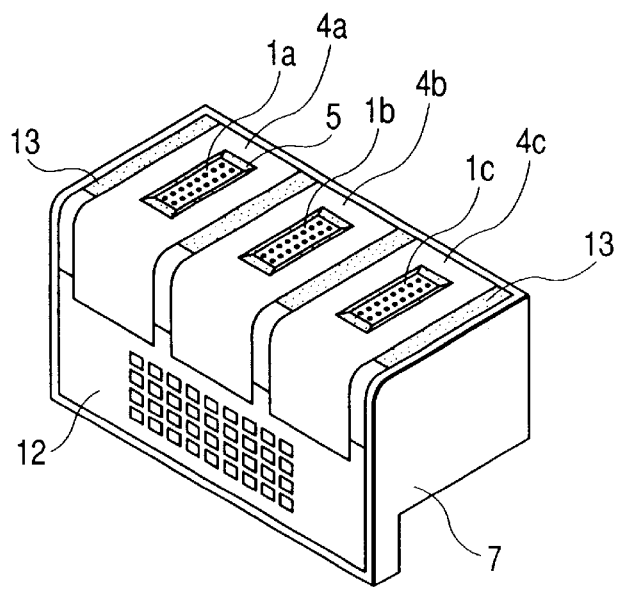
FIG. 13 is a perspective view which shows the outer appearance of the structure of the ink jet recording head in accordance with the second embodiment of the present invention.
Figure 14:
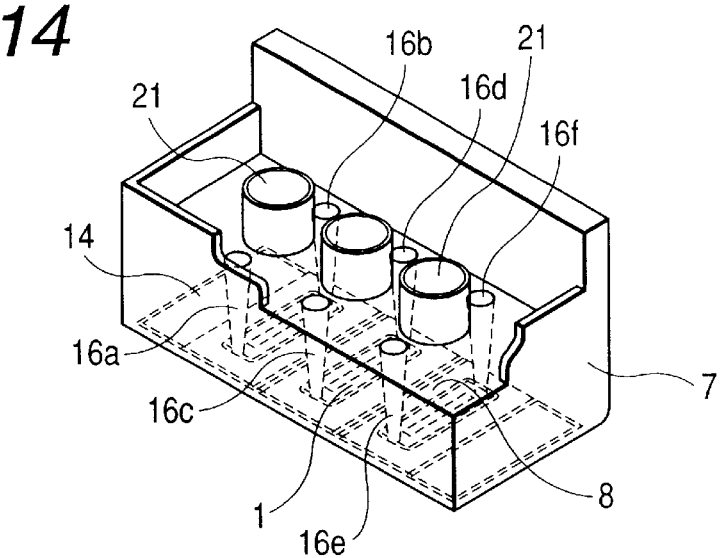
FIG. 14 is the structural view which shows the reverse side and the inner part of the head that represents the structure of the ink jet recording head in accordance with the second embodiment of the present invention.

FIG. 12, FIG. 13, and FIG. 14 are views which illustrate the structure of the ink jet recording head in accordance with a second embodiment of the present invention. FIG. 12 is an exploded perspective view. FIG. 13 is a perspective view which shows the outer appearance thereof after the completion of assembling. FIG. 14 is a view which illustrates the reverse side of the head and the inner structure thereof.

As shown in FIG. 12, FIG. 13, and FIG. 14, the recording head of the present embodiment comprises a plurality of recording elemental substrates 1a to 1c each having a plurality of discharge ports 2 provided with recording elements, respectively, for discharging recording liquid, and the opening portions in which the recording elemental substrates 1a to 1c are incorporated, respectively. Then, by means of the TAB assembling or the like, the head is connected with each of the recording elemental substrates 1a to 1c which are incorporated in the opening portions.

The recording head comprises the wiring substrates 4a to 4c for transmitting electric signals to each of the recording elemental substrates 1a to 1c for discharging recording liquid; the sealing resin A5 to protect the lead lines that connect the recording elemental substrates 1a to 1c with the wiring substrates 4a to 4c, respectively, from erosion by recording liquid or the breakage due to the force that may be exerted from the outside; the supporting member 7 that bonds and fixes the recording elemental substrates 1a to 1c by use of the bonding resins A9a to 9c; and the supporting plates 8a to 8c having opening portions through which the recording elemental substrates 1a to 1c are in contact with the supporting member 7, which bond and fix the wiring substrates 4a to 4c by use of the bonding resins C11a to 11c; the bonding resins B10a to 10c which hold and fix the supporting plates 8a to 8c to the supporting member 7; and the wiring integration substrate 12 which arranges electric signals together for the wiring substrates 4a to 4c.

In this respect, the supporting member 7 is provided with the injection port A16 for filling the sealing resin B13 on the circumference of the recording elemental substrates 1a to 1c from the reverse side thereof.

Now, hereunder, the description will be made of the method for assembling the ink jet recording head which is structured as described above.

At first, the heat generating resistive layer, the wiring, and others are patterned on a silicon wafer by the application of photolithographic techniques. Then, the nozzle walls and discharge ports 2 are formed by the photosensitive resin. Subsequently, by means of the anisotropic etching, the sand blasting, or the like, the recording liquid supply port A3. After that, the outer shape is formed by cutting to form the recording elemental substrates 1a to 1c.

Then, each of the recording elemental substrates 1a to 1c is electrically connected with each of the wiring substrates 4a to 4c by means of the TAB assembling techniques or the like, and the sealing resin A5 is coated on the electric signal input terminals on the recording elemental substrates 1a to 1c side, and also, on the lead lines on the wiring substrates 4a to 4c side, which are used for the electric connection.

Then, the supporting plates 8a to 8c, the contour and opening of which are formed by press and cutting process using aluminum or other material having good heat radiation, are bonded to the supporting member 7 by the application of bonding resin B10a to 10c.

After that, each of the recording elemental substrates 1a to 1c is adhesively fixed to the supporting member 7 by use of the bonding resins A9a to 9c, respectively. Also, each of the wiring substrates 4a to 4c is adhesively fixed to the supporting plates 8a to 8c by use of the bonding resins C11a to 11c, respectively. In this manner, the recording element units 6a to 6c formed by the recording elemental substrates 1a to 1c and the wiring substrates 4a to 4c are fixed to the structural body of the ink jet recording head formed by the supporting member 7 and the supporting plates 8a to 8c.

Then, the wiring substrates 4a to 4c are electrically connected with the wiring integration substrate 12, and the wiring integration substrate 12 is held and fixed to the supporting member 7 by the method of bonding, heat clamping, or the like.

Subsequently, using the injection ports A16a to 16f arranged for the supporting member 7 the sealing resin B13 is filled on the circumference of each of the recording elemental substrates 1a to 1c from the reverse side of the supporting member 7.

The sealing resin filled into the injection ports A16a to 16f has the same property as the filler described in accordance with the first embodiment. After the completion of the filling into the injection ports, the sealing resin is heated (approximately at a temperature of 40 to 70° C.) to flow (to be left intact for a period of 3 to 10 minutes), hence filling it on the circumference of the recording elemental substrates.

Then, the sealing resin is heated at a temperature (of approximately 80 to 150° C.) which is higher than the temperature at which it is caused to flow, hence thermohardening the sealing resin in 2 to 5 hours.

In this respect, the injection ports A16a to 16f are arranged between the recording elemental substrates 1a to 1c and the supporting plates 8a to 8c, respectively, and then, toward the center of the reverse side of the portion where the recording elemental substrate 1 and the wiring substrate 4 are electrically connected.

Also, the injection ports A16a to 16f are tapered to be thinner toward the recording elemental substrate side. Therefore, in accordance with the present embodiment, the sealing resin B13 is not coated directly on the circumference of the recording elemental substrates 1a to 1c. As a result, there is no need for securing the space required for allowing the needle of the sealing resin coating machine between the recording elemental substrates 1a to 1c and the wiring substrates 4a to 4c, hence making it possible to make the outer dimension of the wiring substrate 4 smaller to that extent.

Also, it becomes easier to control the coating amount of the sealing resin B13, because it is not coated directly on the circumference of the recording elemental substrates 1a to 1c, and there is no abrupt changes in the coating amount.

Also, when the needle of the coating machine leaves the sealing location, no cobwebbing phenomenon takes place, because the sealing resin B13 is not coated directly on the circumference of the recording elemental substrates 1a to 1c, thus making it possible to prevent the sealing resin B13 from adhering to the surface of the recording elemental substrate 1.

Also, there is no need for the needle of the coating machine to approach directly the circumference of the recording elemental substrates 1a to 1c when the sealing resin B13 is coated. As a result, it becomes possible to eliminate any possibility that chipping occurs on the outer circumference of the recording elemental substrates 1a to 1c.

Also, it becomes unnecessary to control the coating timing of the sealing resin B13 between the sealer coating locations on one side of the recording elemental substrates 1a to 1c and those on the opposite side. As a result, the time required for the coating process can be shortened.

Also, with the injection ports A16a to 16f being arranged toward the center of the reverse side of the portion where the recording elemental substrates 1a to 1c and the wiring substrates 4a to 4c are electrically connected, the sealing resin B13 is filled beginning with such portion to avoid the presence of residual bubbles.

Also, with the injection ports A16a to 16f being tapered thinner toward the leading end thereof, the injection side of the sealing resin B13 can be made wider to make it easier to perform the positional control of the coating machine of the sealing resin B13.

(Third Embodiment)

Figure 15:
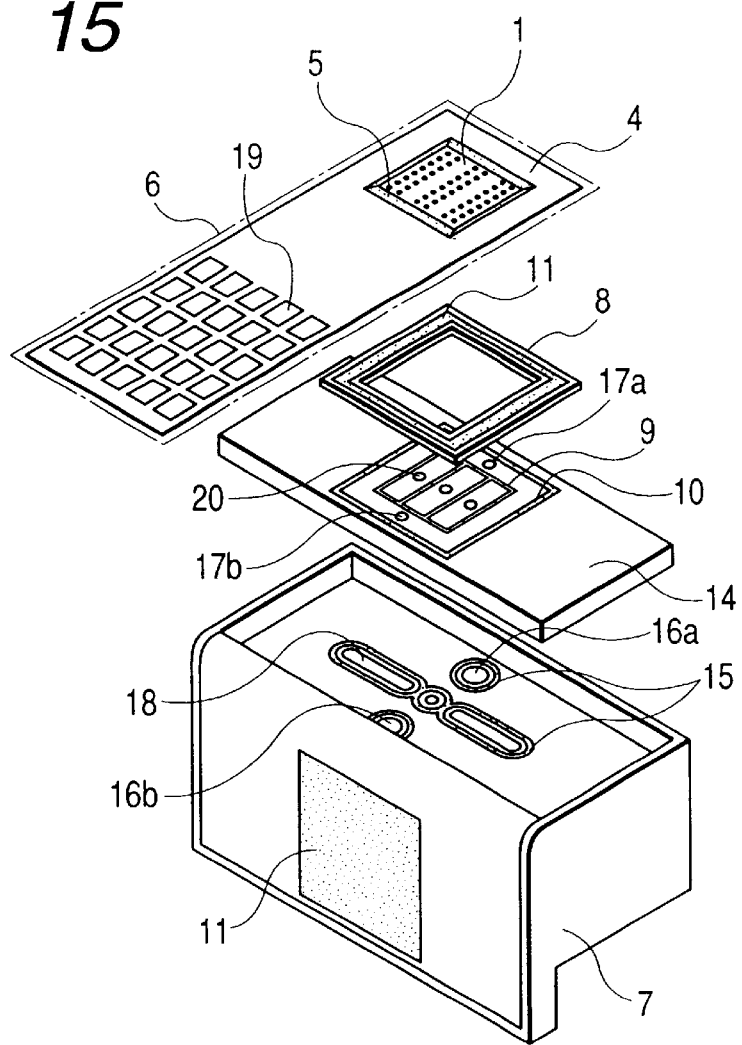
FIG. 15 is an exploded perspective view which shows the structure of the ink jet recording head in accordance with a third embodiment of the present invention.
Figure 16:
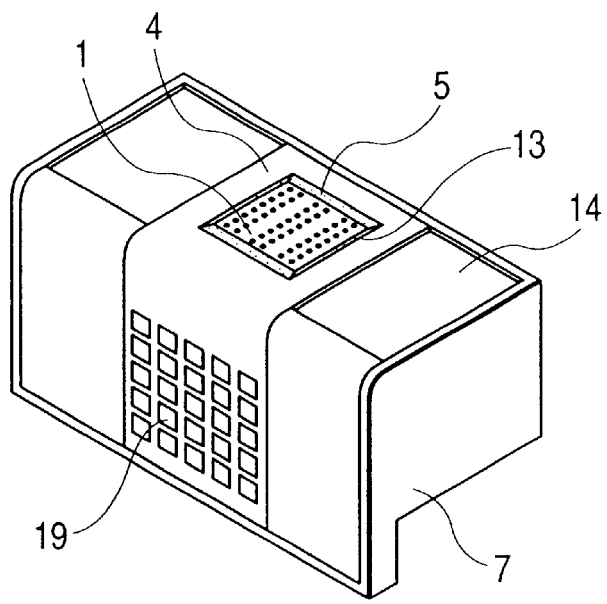
FIG. 16 is a perspective view which shows the outer appearance of the structure of the ink jet recording head in accordance with the third embodiment of the present invention.
Figure 17:
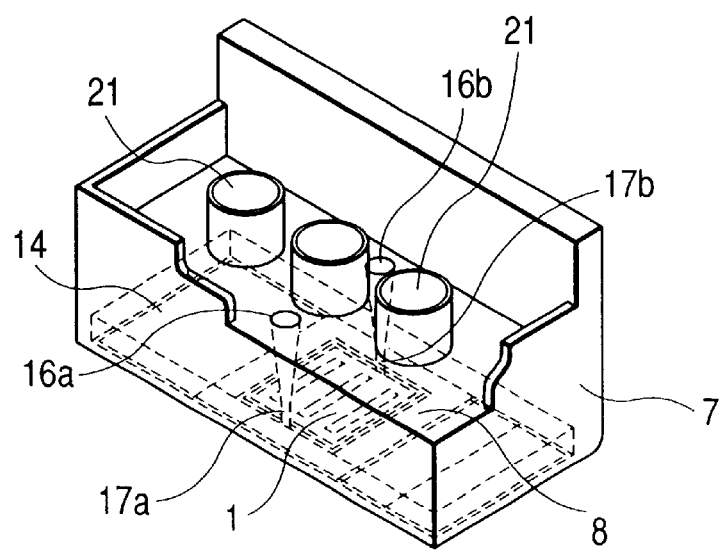
FIG. 17 is the structural view which shows the reverse side and the inner part of the head that represents the structure of the ink jet recording head in accordance with the third embodiment of the present invention.

FIG. 15, FIG. 16, and FIG. 17 are views which illustrate the structure of the ink jet recording head in accordance with a third embodiment of the present invention. FIG. 15 is an exploded perspective view. FIG. 16 is a perspective view which shows the outer appearance thereof after the completion of assembling. FIG. 17 is a view which illustrates the reverse side of the head and the inner structure thereof.

As shown in FIG. 15, the ink jet recording head of the present embodiment comprises the recording element unit 6 which are formed by the recording elemental substrate 1 having a plurality of discharge port arrays therefor and a wiring substrate 4; a supporting plate 8; a supporting substrate 14; and a supporting member 7.

In recent years, along with the materialization of multiple coloring of the photographic quality, the ink jet recording head is generally provided with a plurality of recording elemental substrates mounted thereon. Also, in order to output high quality images, a plurality of recording elemental substrates are integrated. Then, the recording elemental substrate 1 arranged in the precision of the photolithographic patterning is electrically connected with the wiring substrate 4.

Also, in accordance with the present embodiment, the discharge port arrays for each color are extremely close to each other. Therefore, each of the recording liquid flow paths 18 provided for the supporting member 7 is arranged to get together near on the central portion. Also, the flow paths 18 are formed by bonding the supporting substrate 14 by coating the bonding resin D15 on the circumference of the groove arranged for the supporting member 7.

Then, the sealing resin B13 is coated from the reverse side of the supporting member 7, and filled on the circumference of the recording elemental substrate 1 through the injection ports A16a and 16b, and the injection ports B17a and 17b.

The sealing resin filled into the injection ports A16a and 16b, and the injection ports B17a and 17b has the same property as the filler described in accordance with the first embodiment. After the completion of the filling into the injection ports, the sealing resin is heated (approximately at a temperature of 40 to 70° C.) to flow (to be left intact for a period of 3 to 10 minutes), hence filling it on the circumference of the recording elemental substrates.

Then, the sealing resin is heated at a temperature (of approximately 80 to 150° C.) which is higher than the temperature at which it is caused to flow, hence thermohardening the sealing resin in 2 to 5 hours.

The injection ports A16a and 16b are tapered to be thinner toward the recording elemental substrate side, and the diameter of each hole on the connecting side with the injection ports B17a and 17b is arranged to be almost the same as the injection ports B17a and 17b.

The injection ports B17a and 17b are arranged toward near the center on the reverse side of the portion where the recording elemental substrate 1 and the wiring substrate 4 are electrically connected.

Therefore, in accordance with the present embodiment, the sealing resin B13 is not coated directly on the circumference of the recording elemental substrates 1. As a result, there is no need for securing the space required for allowing the needle of the sealing resin coating machine to be placed between the recording elemental substrates 1 and the wiring substrates 4, hence making it possible to make the outer dimension of the wiring substrate 4 smaller to that extent.

Also, it becomes easier to control the coating amount of the sealing resin B13, because it is not coated directly on the circumference of the recording elemental substrates 1, and there is no abrupt changes in the coating amount.

Also, when the needle of the coating machine leaves the sealing location, no cobwebbing phenomenon takes place, because the sealing resin B13 is not coated directly on the circumference of the recording elemental substrates 1, thus making it possible to prevent the sealing resin B13 from adhering to the surface of the recording elemental substrate 1.

Also, there is no need for the needle of the coating machine to approach directly the circumference of the recording elemental substrates 1 when the sealing resin B13 is coated. As a result, it becomes possible to eliminate any possibility that chipping occurs on the outer circumference of the recording elemental substrates 1.

Also, it becomes unnecessary to control the coating timing of the sealing resin B13 between the sealer coating locations on one side of the recording elemental substrates 1 and those on the opposite side. As a result, the time required for the coating process can be shortened.

Also, with the injection ports A16a and 16b and the injection ports B17a and 17b being arranged toward the center of the reverse side of the portion where the recording elemental substrates 1 and the wiring substrates 4 are electrically connected, the sealing resin B13 is filled beginning with such portion to avoid the presence of residual bubbles.

Also, with the injection ports A16a and 16b being tapered thinner toward the leading end thereof, the injection side of the sealing resin B13 can be made wider to make it easier to perform the positional control of the coating machine of the sealing resin B13. Also, since the diameter of each hole on the connecting side with the injection ports B17a and 17b are almost the same as the injection ports B17a and 17b, the step difference between the injection ports A16a and 16b, and the injection ports B17a and 17b is reduced to make it difficult for the sealing resin B13 to reside on such portions.

(Fourth Embodiment)

Figure 18:
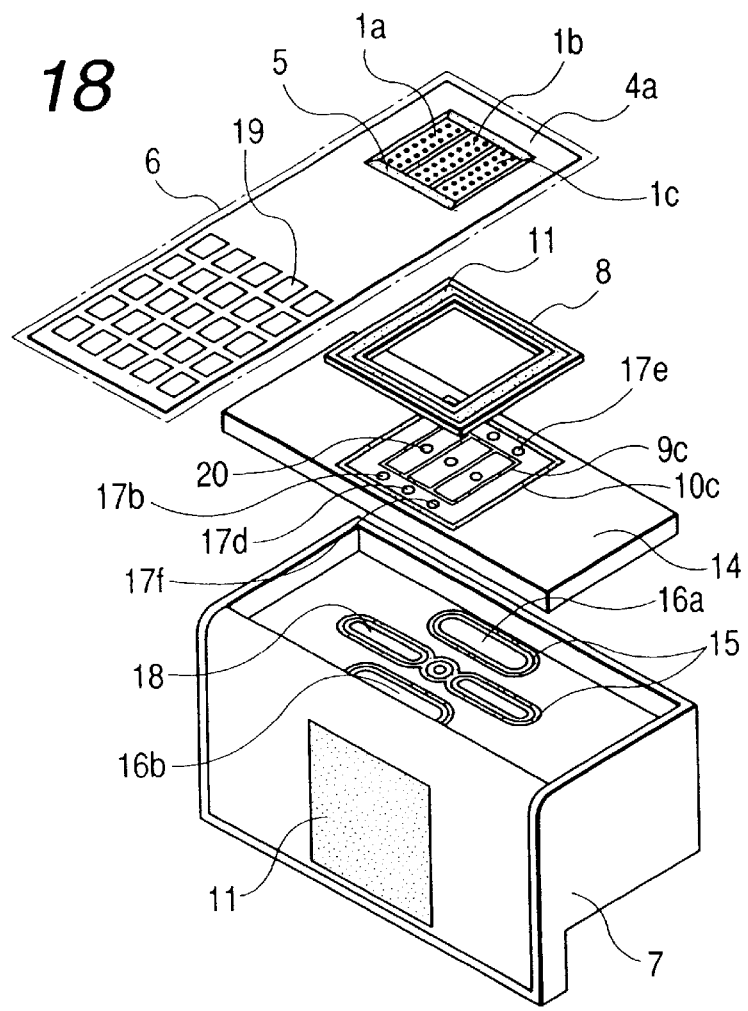
FIG. 18 is an exploded perspective view which shows the structure of the ink jet recording head in accordance with a fourth embodiment of the present invention.
Figure 19:
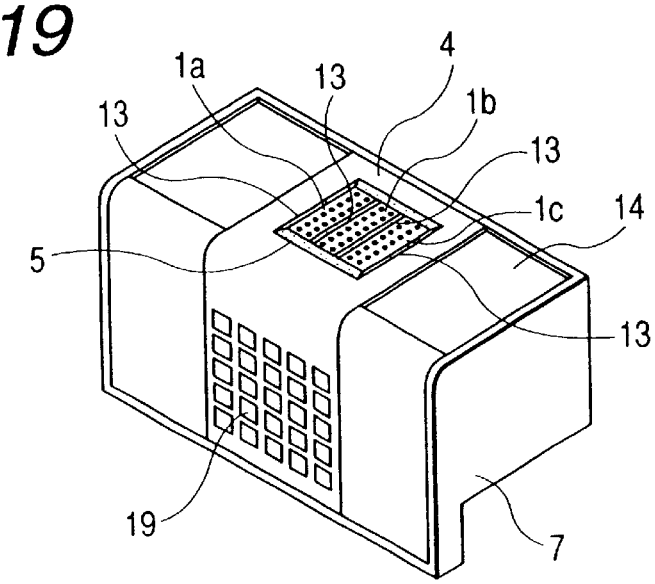
FIG. 19 is a perspective view which shows the outer appearance of the structure of the ink jet recording head in accordance with the fourth embodiment of the present invention.
Figure 20:
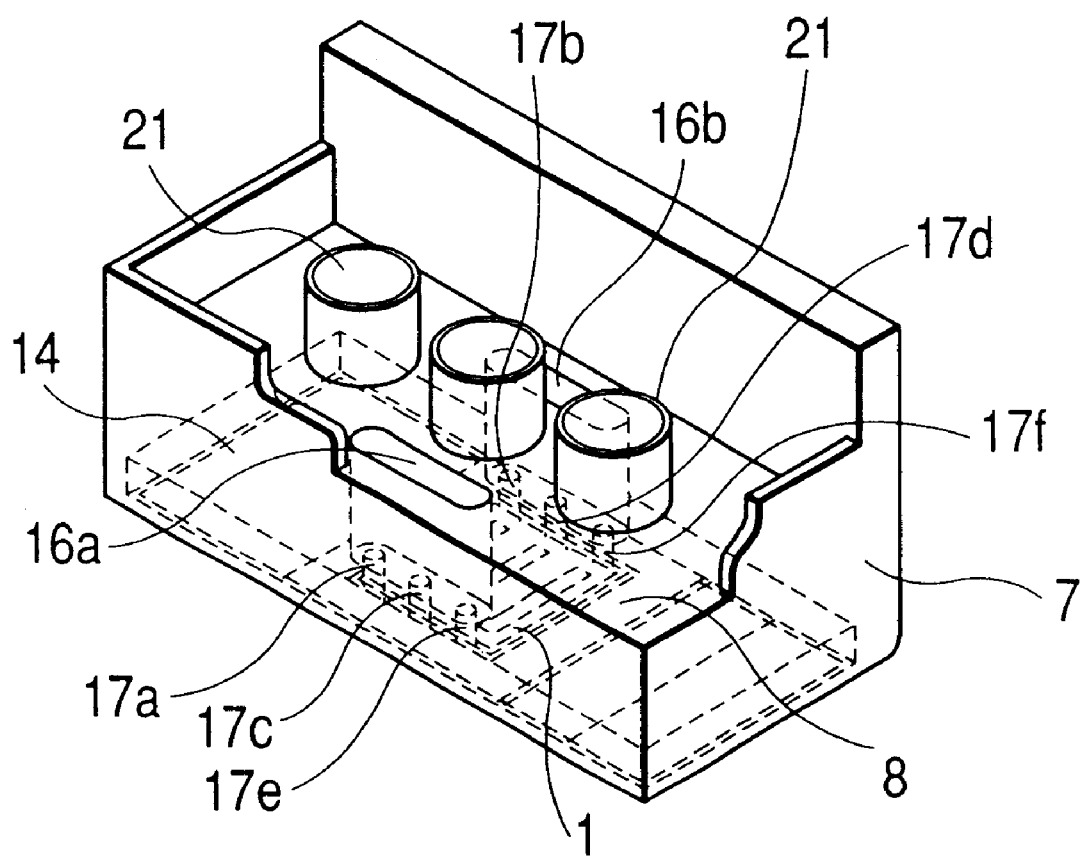
FIG. 20 is the structural view which shows the reverse side and the inner part of the head that represents the structure of the ink jet recording head in accordance with the fourth embodiment of the present invention.

FIG. 18, FIG. 19, and FIG. 20 are views which illustrate the structure of the ink jet recording head in accordance with another embodiment of the present invention. FIG. 18 is an exploded perspective view. FIG. 19 is a perspective view which shows the outer appearance thereof after the completion of assembling. FIG. 20 is a view which illustrates the reverse side of the head and the inner structure thereof.

As shown in FIG. 18, the ink jet recording head of the present embodiment comprises the recording element unit 6 which are formed by the recording elemental substrates 1a to 1c and a wiring substrate 4; a supporting plate 8; a supporting substrate 14; and a supporting member 7.

In order to make the costs of an ink jet recording head lower, it is effective to arrange the recording elemental substrate which occupies a major portion of the costs in a smaller chip so that the number of chips obtainable is increased per wafer. Also, by dividing the recording elemental substrate into the smaller ones per color, it becomes possible to improve the production yields thereof. Therefore, a plurality of recording elemental substrates 1a to 1c are electrically connected with the wiring substrate 4 to provide one recording element unit.

Then, each of the injection ports B17a to 17f are provided for the reverse side of the portion where each of the recording elemental substrates 1a to 1c and the wiring substrate 4 are connected, and the sealing resin B13 is filled from the injection ports A16a and 16b which are arranged for the supporting member 7.

The sealing resin filled into the injection ports A16a and 16b has the same property as the filler described in accordance with the first embodiment. After the completion of the filling into the injection ports, the sealing resin is heated (approximately at a temperature of 40 to 70° C.) to flow (to be left intact for a period of 3 to 10 minutes), hence filling it on the circumference of the recording elemental substrates.

After that, the sealing resin is thermohardened in 2 to 5 hours at a higher temperature (approximately 80 to 150° C.) than the temperature at which the sealing resin is caused to flow.

The injection ports B17a to 17f are arranged toward near the center of the reverse side of the portion where the recording elemental substrate 1 and the wiring substrate 4 are electrically connected. Also, the injection ports A16a and 16b are arranged corresponding to the injection ports B17a, 17c and 17e or 17b, 17d, and 17f on the same connecting side with the wiring substrate 4. Therefore, when the sealing resin B13 is coated once, it can be filled on the circumference of the recording elemental substrates 1a to 1c from a plurality of injection ports B17a to 17f.

As a result, in accordance with the present embodiment, the sealing resin B13 is not coated directly on the circumference of the recording elemental substrates 1a to 1c. There is no need for securing the space required for allowing the needle of the sealing resin coating machine to be placed between the recording elemental substrates 1a to 1c and the wiring substrate 4, and also, between the adjacent recording elemental substrates 1a to 1c, hence making it possible to make the outer dimension of the wiring substrate 4 smaller to that extent.

Also, it becomes easier to control the coating amount of the sealing resin B13, because it is not coated directly on the circumference of the recording elemental substrates 1a to 1c, and there is no abrupt changes in the coating amount.

Also, when the needle of the coating machine leaves the sealing location, no cobwebbing phenomenon takes place, because the sealing resin B13 is not coated directly on the circumference of the recording elemental substrates 1a to 1c, thus making it possible to prevent the sealing resin B13 from adhering to the surface of the recording elemental substrates 1a to 1c.

Also, there is no need for the needle of the coating machine to approach directly the circumference of the recording elemental substrates 1a to 1c when the sealing resin B13 is coated. As a result, it becomes possible to eliminate any possibility that chipping occurs on the outer circumference of the recording elemental substrates 1a to 1c.

Also, it becomes unnecessary to control the coating timing of the sealing resin B13 between the sealer coating locations on one side of the recording elemental substrates 1a to 1c and those on the opposite side. As a result, the time required for the coating process can be shortened.

Also, with the injection ports A16a and 16b, and the injection ports B17a to 17f being arranged toward the center of the reverse side of the portion where the recording elemental substrates 1a to 1c and the wiring substrates 4 are electrically connected, the sealing resin B13 is filled beginning with such portion to avoid the presence of residual bubbles.

Also, with the injection ports A16a and 16b being arranged corresponding to the injection ports B17a, 17c, and 17e or 17b, 17d, and 17f on the same connecting side with the wiring substrate 4, it becomes possible to fill the sealing resin B13 on the circumference of the recording elemental substrates 1a to 1c only by one-time coating from a plurality of injection ports B17a to 17f, hence making it possible to shorten the time required for this process.

As has been described above, in accordance with the present invention, it is possible to fill fillers in good condition when the fillers are filled on the circumference of the recording elemental substrates. It is also possible to control the amount of fillers appropriately.

Since the present invention is structured as described above, it is possible to eliminate any electrical and structural defects in order to materialize a highly reliable and compact ink jet recording head.

Also, in accordance with the present invention, the filler retaining portion is arranged to be communicated with the areas (sealing areas) where sealing is needed. Then, the sealing resin is filled from the filler retaining portion to the sealing areas. As a result, there is no need for securing the space required to allow the needle of the sealing resin coating machine to enter on the circumference of the recording elemental substrates that become the sealing areas, nor between the adjacent recording elemental substrates, hence making it possible to make the outer dimension of the wiring substrates smaller to that extent.

Also, in accordance with the present invention, it becomes easier to control the coating amount, because the sealing resin is not coated directly on the circumference of the recording elemental substrates, and the coating amount rarely changes abruptly.

Also, in accordance with the present invention, no cobwebbing phenomenon takes place when the needle of the coating machine leaves the sealing location, because the sealing resin is not coated directly on the circumference of the recording elemental substrates, thus making it possible to prevent the sealing resin from adhering to the surface of the recording elemental substrates.

Also, in accordance with the present invention, there is no need for the needle of the coating machine to approach directly the circumference of the recording elemental substrates when the sealing resin is coated. As a result, it becomes possible to eliminate any possibility that chipping occurs on the outer circumference of the recording elemental substrates.

Also, in accordance with the present invention, it becomes unnecessary to control the coating timing of the sealing resin between the sealer coating locations on one side of the recording elemental substrates and those on the opposite side. As a result, the time required for the coating process can be shortened.

Also, in accordance with the present invention, the filler retaining portion is arranged to be communicated with the vicinity of the center of the reverse side where the recording elemental substrates and the wiring substrates are electrically connected, the sealing resin is filled beginning with such portion to avoid the presence of residual bubbles.

Also, in accordance with the present invention, the filler retaining portion is tapered to become thinner toward its leading end, hence making the entrance of the injection port of the sealing resin wider and the positional control of the sealing resin coating machine easier.

Also, in accordance with the present invention, the supporting substrate is inclusively arranged between the recording substrates and the supporting member, while the filler retaining portion is tapered to be thinner toward its leading end. Then, the structure is arranged so that the difference is made smaller between the diameters of such tapered end and the communication hole arranged for the supporting substrate, hence making it difficult for the sealing resin to remain in the portion thus structured when the sealing resin is filled. In this manner, the required amount of sealing resin can be reduced.

Also, with the supporting substrate being inclusively arranged between the recording elemental substrates and the supporting member, it becomes possible to fill the fillers through a plurality of communication holes by only one coating with the provision of the plurality of the holes which are communicated from the filler retaining portion to each of the sealing areas. In this manner, the time required for the filling process can be shortened.

What is claimed is:

1. A method for manufacturing an ink jet recording head provided with a recording elemental substrate having a discharge port group for discharging ink, an electric wiring substrate electrically connected with the recording elemental substrate, and a supporting member for holding and fixing the recording elemental substrate and the electrical wiring substrate, comprising the steps of:

injecting thermohardening filler into a filler retaining portion communicating with a sealing area requiring sealing;

filling the sealing area with the thermohardening filler injected into the filler retaining portion by heating the filler to flow; and hardening the filled thermohardening filler, wherein the sealing area is formed by the supporting member, the recording elemental substrate, and the electric wiring substrate, and wherein the filler retaining portion is a stepping portion of the recording elemental substrate and the supporting member for supporting the recording elemental substrate, and is a portion adjacent to a side face of the recording elemental substrate having no electrode terminals arranged therefor.

2. A method for manufacturing an ink jet recording head according to claim 1, wherein the filler retaining portion is an opening portion arranged on a reverse side of a surface of the supporting member for supporting the recording elemental substrate.

3. A method for manufacturing an ink jet recording head according to claim 1, wherein the recording elemental substrate is provided in plural units which are arranged in parallel.

4. A method for manufacturing an ink jet recording head according to claim 1, wherein a heating temperature in said filler filling step is lower than a heating temperature in said filler hardening step.

5. A method for manufacturing an ink jet recording head according to claim 1, wherein a heating temperature in said filler filling step is a temperature making a viscosity of the filler 15 poise or less.

6. A method for manufacturing an ink jet recording head according to claim 1, wherein a heating temperature in said filler hardening step is 80° C. or more.

* * * * *